US010099774B2

(12) United States Patent
Provost et al.

(10) Patent No.: US 10,099,774 B2
(45) Date of Patent: Oct. 16, 2018

(54) SYSTEM AND METHOD FOR CORRECTING WING TWIST OF AN AIRCRAFT

(71) Applicant: THE BOEING COMPANY, Chicago, IL (US)

(72) Inventors: Stephen N. Provost, St. Louis, MO (US); Dale M. Pitt, Hazelwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/455,353

(22) Filed: Mar. 10, 2017

(65) Prior Publication Data
US 2018/0099740 A1 Apr. 12, 2018

Related U.S. Application Data

(63) Continuation-in-part of application No. 15/291,505, filed on Oct. 12, 2016.

(51) Int. Cl.
G01B 11/14 (2006.01)
B64C 13/16 (2006.01)
(Continued)

(52) U.S. Cl.
CPC ............ B64C 13/16 (2013.01); B64C 3/385 (2013.01); B64D 43/00 (2013.01); B64D 45/00 (2013.01); G01B 11/16 (2013.01)

(58) Field of Classification Search
CPC ......... B64C 33/02; G01B 11/16; G01B 11/27; G01B 21/24; G01C 25/005; G01D 5/48
(Continued)

(56) References Cited

U.S. PATENT DOCUMENTS 5,220,159 A * 6/1993 Friedenthal ........... F41G 7/2213
250/201.9
5,331,577 A * 7/1994 Grimes .................. G01B 11/16
702/152
(Continued)

FOREIGN PATENT DOCUMENTS

EP 2343498 A1 7/2011
WO WO-2016073208 A1 5/2016

OTHER PUBLICATIONS

DeAngelis, "In-Flight Deflection Measurement of the HiMAT Aeroelastically Tailored Wing", vol. 19, No. 12, Dec. 1982.
(Continued)

Primary Examiner — Hoa Pham
(74) Attorney, Agent, or Firm — Marshall, Gerstein & Borun LLP

(57) ABSTRACT

A system which includes a first light beam locating sensor associated with a first position to be located on a wing of an aircraft. The first light beam locating sensor senses a first light beam at an identifiable position on the first light beam locating sensor. A processor is configured to receive a first signal from the first light beam locating sensor wherein the first signal includes a first identifiable position on the first light beam locating sensor. The processor is configured to determine a location of the first position on the wing and perform a first comparison of the location of the first position on the wing to a predetermined analyzed location of the first position on the wing.

20 Claims, 10 Drawing Sheets

(51) Int. Cl.
| | | |
|---|---|---|
| B64D 43/00 | (2006.01) | |
| B64D 45/00 | (2006.01) | |
| G01B 11/16 | (2006.01) | |
| B64C 3/38 | (2006.01) | |

(58) Field of Classification Search
USPC .................................................. 356/601–623
See application file for complete search history.

(56) References Cited

U.S. PATENT DOCUMENTS

| | | | | |
|---|---|---|---|---|
| 6,317,954 | B1* | 11/2001 | Cunningham | G01B 11/002 |
| | | | | 29/407.09 |
| 8,838,298 | B2 | 9/2014 | Hinnant et al. | |
| 2007/0268494 | A1* | 11/2007 | Hara | G01S 17/42 |
| | | | | 356/498 |
| 2010/0076624 | A1 | 3/2010 | Hinnant, Jr. et al. | |
| 2010/0201972 | A1* | 8/2010 | Marsh | G01B 11/002 |
| | | | | 356/152.1 |
| 2012/0153032 | A1* | 6/2012 | Svanebjerg | B64F 5/0063 |
| | | | | 239/1 |
| 2012/0262550 | A1* | 10/2012 | Bridges | G01C 15/002 |
| | | | | 348/46 |
| 2012/0262698 | A1* | 10/2012 | Day | G01C 15/002 |
| | | | | 356/4.01 |
| 2015/0316649 | A1* | 11/2015 | Marsh | G01S 17/88 |
| | | | | 356/4.01 |
| 2017/0305530 | A1* | 10/2017 | Finn | B64C 9/14 |
| 2018/0105256 | A1* | 4/2018 | Good | B64C 3/56 |

OTHER PUBLICATIONS

Kannemans, "Flight Testing a Wing Deflection Measurement Method", AIAA-95/3434-CP, 1995.
Gross, "ETW Analytical Approach to Assess the Wing Twist of Pressure Plotted Wind Tunnel Models", 40th AIAA Aerospace Sciences Meeting & Exhibit, Jan. 14-17, 2002.
Ruyten et al., "Demonostration of Optical Wing Deformation Measurements at the Arnold Engineering Development Center", AIAA 2009-1520, Jan. 5-8, 2009.
Burner et al., "Automated Wing Twist and Bending Measurements Under Aerodynamic Load", AIAA Meeting Papers on Disc, Jun. 1996.
Nguyen et al., "Nonlinear Aeroelasticity of a Flexible Wing Structure Coupled with Aircraft Flight Dynamics", AIAA 2012-1792, Apr. 23-26, 2012.
Sant et al., "A Model Deformation Measurement Method and its Application on PSP Measurements", AIAA 2004-2192, Jun. 28-Jul. 1, 2004.
Burner et al., "Wing Deformation Measurements of the DLR-F6 Transport Configuration in the National Transonic Facility", AIAA 2008-6921, Aug. 18-21, 2008.
Black et al., "Videogrammetry Dynamics Measurements of a Lightweight Flexible Wing in a Wind Tunnel", Journal of Aircraft, vol. 47, No. 1, Jan.-Feb. 2010.
Barrows, "Videogrammetric Model Deformation Measurement Technique for Wind Tunnel Applications", 45th AIAA Aerospace Sciences Meeting and Exhibit, Jan. 8-11, 2007.
Sant, "Model Deformation Measurement (MDM) at Onera", 25th AIAA Applied Aerodynamics Conference, Jun. 25-28, 2007.
Morris et al., "Measurement of the Bending and Twist in a Deforming Airfoil Using Laser-Based Imaging", 43rd AIAA Aerospace Sciences Meeting and Exhibit, Jan. 10-13, 2005.
Pang et al., "In-Flight Wing Deformation Measurement System for Small Unmanned Aerial Vehicles", AIAA SciTech, Jan. 13-17, 2014.
Kurita et al., "In-Flight Wing Deformation Measurement", AIAA 2013-0967, Jan. 7-10, 2013.
Jeng-Dao Lee et al., "Implementation of Low-Cost Laser Range Finder with Object Tracking Function", 2017 3rd International Conference on Control, Automation and Robotics, pp. 612-616 dated Apr. 24, 2017.
European Search Report for EP Application No. 17195884.6 dated Jan. 16, 2018.

\* cited by examiner

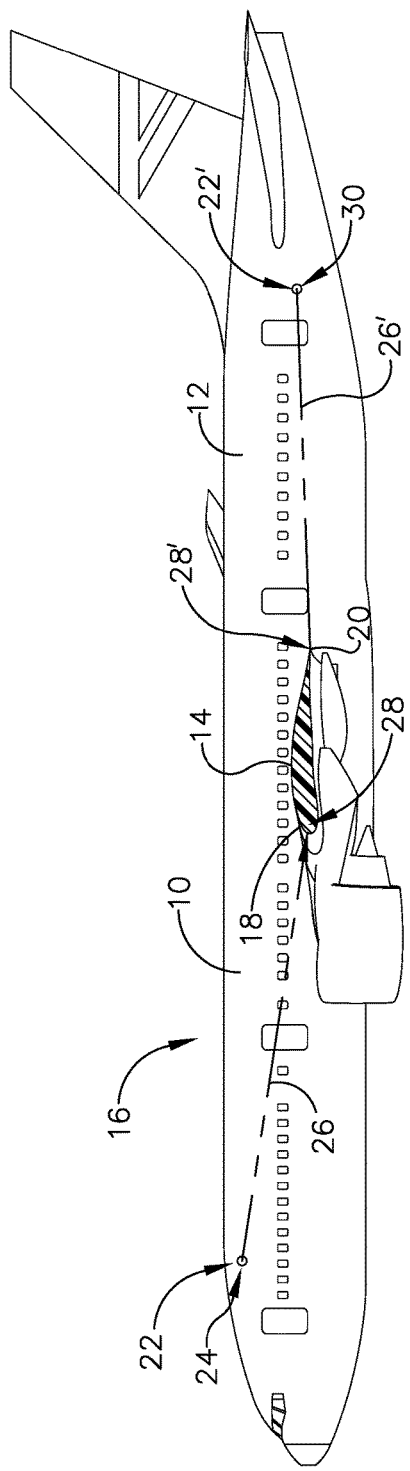
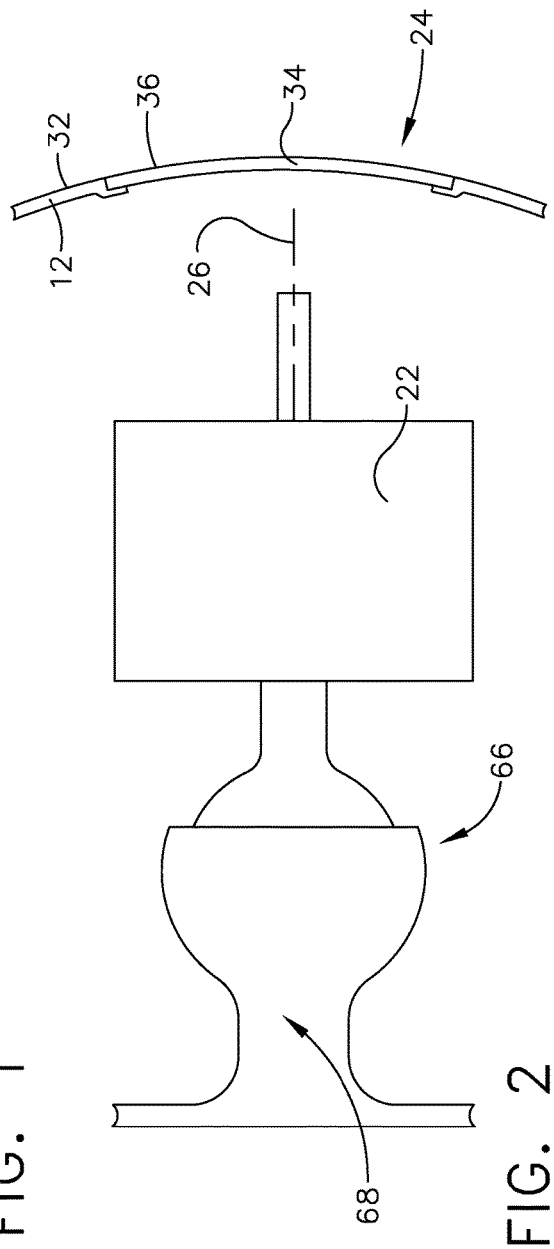
FIG. 1
FIG. 2

SYSTEM AND METHOD FOR CORRECTING WING TWIST OF AN AIRCRAFT

CROSS-REFERENCE TO RELATED APPLICATIONS

This is a continuation-in-part of U.S. patent application Ser. No. 15/291,505 filed Oct. 12, 2016. The disclosure of each priority application is hereby incorporated herein by reference.

FIELD

This invention relates to a system and a method for minimizing drag on a wing of an aircraft, and more particularly, a system and a method for correcting wing twist of an aircraft during flight.

BACKGROUND

The wings of an aircraft are flexible. Bending and twisting of the wings during flight can, in turn, create unwanted additional drag to the aircraft, particularly, during a cruise portion of the flight. Additional drag to the aircraft results in an increase in fuel consumption which results in higher operational costs.

Cameras and markers on the wings have been employed to observe a particular configuration of the wings of a test or experimental aircraft during flight operation or during flight simulation. However, utilizing a camera during flight operations will not be at times practical or useful. Optical detection can be impaired, for example, at altitudes where adverse weather conditions may occur. Also, poor or diminished light conditions can also impair the camera optical detection performance with respect to observing the configuration of the wings during flight.

There is a need to provide a system and method by which detects wing deflection and twist during flight and takes corrective measures.

SUMMARY

An example of a system includes a first light beam locating sensor associated with a first position to be located on a wing of an aircraft; wherein the first light beam locating sensor senses a first light beam at an identifiable position on the first light beam locating sensor. The system further includes a processor configured to receive a first signal from the first light beam locating sensor, wherein the first signal includes a first identifiable position on the first light beam locating sensor. The processor is configured to determine a location of the first position on the wing and perform a first comparison of the location of the first position on the wing to a predetermined analyzed location of the first position on the wing.

An example a method includes the steps of sensing a first light beam at an identifiable position on a first light beam locating sensor, wherein the first light beam locating sensor is associated with a first position to be located on a wing of an aircraft. The method further includes receiving by a processor a first signal from the first light beam locating sensor, wherein the first signal including the identifiable position on the first light beam locating sensor and determining by the processor a location of the first position on the wing. The method further includes performing by the processor a first comparison of the location of the first position on the wing to a predetermined analyzed location of the first position on the wing.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 1 is a side elevation view of an aircraft with a cross section of a wing of the aircraft taken along a chord of the wing and with laser beams emitted from the fuselage toward leading and trailing edges of wing;

FIG. 2 is a schematic side profile view of a laser secured to a gimbal positioned spaced apart behind a cross section view of a first transparent panel conformed with an outer surface of the fuselage of aircraft;

DESCRIPTION

Figure 3:
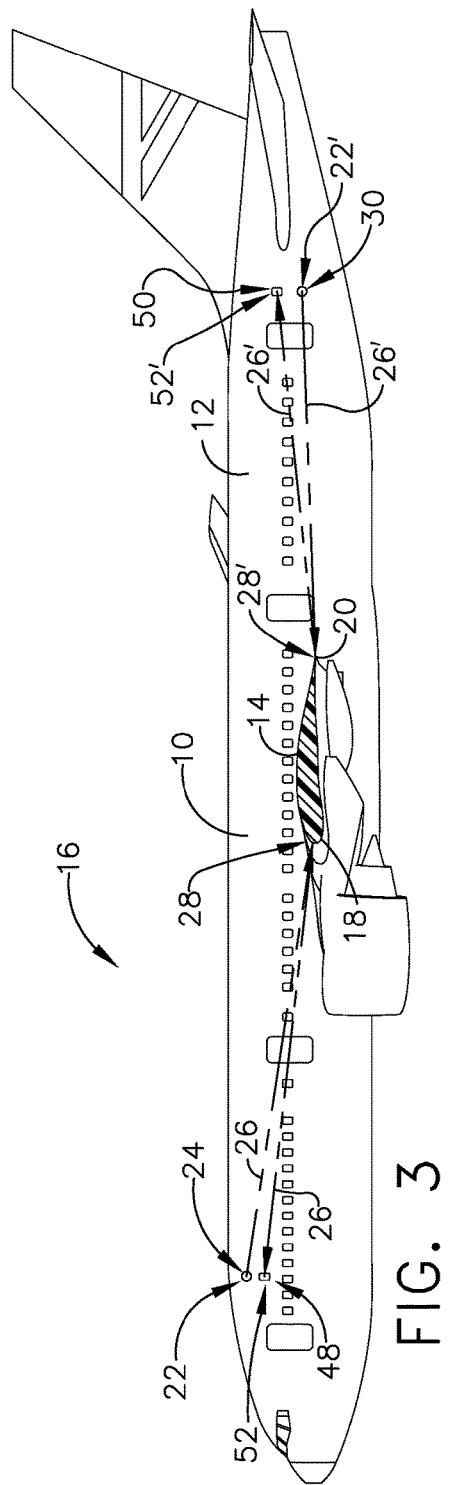
FIG. 3 is the side elevation view of the aircraft of FIG. 1 wherein the laser beams emitted from the fuselage to the leading and the trailing edges of the wing are reflected back toward the fuselage of the aircraft.

During long flights, for example, an aircraft consumes quantities of fuel which, in turn, changes the overall weight of the aircraft. This change in the weight loading of the aircraft also affects the required aerodynamic lift needed to be applied to the wings to keep the aircraft in trimmed flight. These changes in the weight load and aerodynamic lift conditions of the aircraft during cruise can result in imparting deflection to portions of the wing relative to the fuselage and also in imparting twist to the wing relative to the fuselage. These changing conditions of weight loading and aerodynamic lift forces during cruise flight can also impart a change to the flight angle-of-attack of the aircraft which can also result in adding additional drag to the aircraft.

With the occurrence of deflecting or bending and twisting of portions of the wings during flight, there is a need to monitor the wings during flight to detect and measure or ascertain portions of the wing which are deflecting and twisting relative to the fuselage. With being able to detect and ascertain the amount of deflecting and twisting incurred by portions of the wings during flight, this information provides an opportunity to apply corrective measures to counter the deflecting and twisting of portions of the wings so as to provide a beneficial configuration to the wings in order to reduce or eliminate the wings imparting additional drag to the aircraft. A reduction of drag, as mentioned above, will provide a reduction in fuel consumption and reduction in operational costs.

With more aircraft now being constructed of composite material, the wings that are being constructed of composite material tend to experience more pronounced movement and bending during operation. This more pronounced movement by wings further enhances a need to monitor the deflecting and twisting of the wings during flight. Monitoring the deflection and twisting configurations of the wings will assist in determining what corrective modifications would need to be made to the configuration of the wings during flight in order to obtain optimal and efficient operational performance of the aircraft. Again, modification to the configuration of the wings to reduce the occurrence of deflection and twist, as mentioned above, reduces or eliminates the creation of additional drag to the aircraft providing reduced operational costs. Removal of twist from the wing will reduce unwanted drag during flight, will reduce the consumption of fuel, and will result in lower operational cost of the aircraft.

As mentioned earlier, wings of an aircraft are constructed to be flexible. Factors such as change in the weight of the aircraft based, for example, on fuel consumption during flight, as well as, change in the required aerodynamic lift loads needed to be exerted on the wings to maintain the aircraft in trimmed flight, impart deflection to portions of the wings along the length of the wings relative to the fuselage. Deflections of portions of the wing which vary along a chord of a wing, impart a twist configuration of the wing relative to the fuselage. The change in the wing configuration with respect to deflection and twist creates additional drag to the aircraft during flight and as a result increases fuel consumption and creates higher operational costs. It would be beneficial to detect and ascertain or measure the deflection and twist occurring in the wings at locations along the wings during flight. With obtaining information with respect to the deflection and twist of the wings during flight, an opportunity is provided to apply corrective measures with respect to the deflection and twist configurations of the wings. The corrective measures applied during flight can reduce or eliminate the additional drag and thereby reduce operational costs.

In understanding the configuration of a wing during flight, it would be helpful to monitor and ascertain a position of the wing at predetermined locations on the wing to determine the deflection of the wing relative to the fuselage at the predetermined locations. In addition, it would be helpful to detect and ascertain the deflection at two predetermined locations on the wing that are positioned on the same chord of the wing. The two predetermined locations positioned on the same chord on the wing in an example discussed herein will be positioned at the leading edge of the wing and at the trailing edge of the wing. In an example of a monitoring system discussed herein, the monitoring system will detect and ascertain deflections of the wing relative to the fuselage on the leading and trailing edges of the wing which are on the same chord so as to also provide twist configuration of the wing. This monitoring will take place on at least two or more chords spaced apart along the wing.

In referring to FIG. 1, aircraft 10 with fuselage 12 and wing 14 are shown. Monitoring system 16 is also shown for use in monitoring a deflection position of wing 14 at a predetermined location on wing 14 during flight. Wing 14, as shown in FIG. 1, shows leading edge 18 and trailing edge 20. Different examples of monitoring system 16 will be discussed herein and in each of the examples a laser is utilized in the system which is secured to fuselage 12 of aircraft 10.

In a first example of the laser, laser 22, as seen in FIG. 2, is positioned on fuselage 12 at a first location 24 positioned forward of wing 14. Laser 22 emits laser beam 26 in a direction of wing 14. Laser 22 is positioned to emit laser beam 26 to a predetermined location, in this example, positioned at leading edge 18 of wing 14 and onto laser beam target device 28 secured to wing 14 at that location.

In a second example of the laser used in monitoring system 16, is laser 22' secured to fuselage 12 positioned at second location 30 aft of wing 14, as indicated in FIG. 1. Laser 22' is not shown in detail as secured to fuselage 12, however laser 22' is similarly constructed and similarly installed at second location 30, as is shown for laser 22 as constructed and installed at first location 24 in FIG. 2. This installation will be described in more detail below. Laser 22' is positioned and secured to fuselage 12 and emits laser beam 26', as seen in FIG. 1, and as is similarly shown for laser 22 which emits laser beam 26 in FIG. 2. Laser 22' emits laser beam 26' in the direction of wing 14 and is positioned to emit laser beam 26' to a predetermined location, in this second example, positioned at trailing edge 20 of wing 14 and onto laser beam target device 28' also secured to wing 14.

Figure 4:
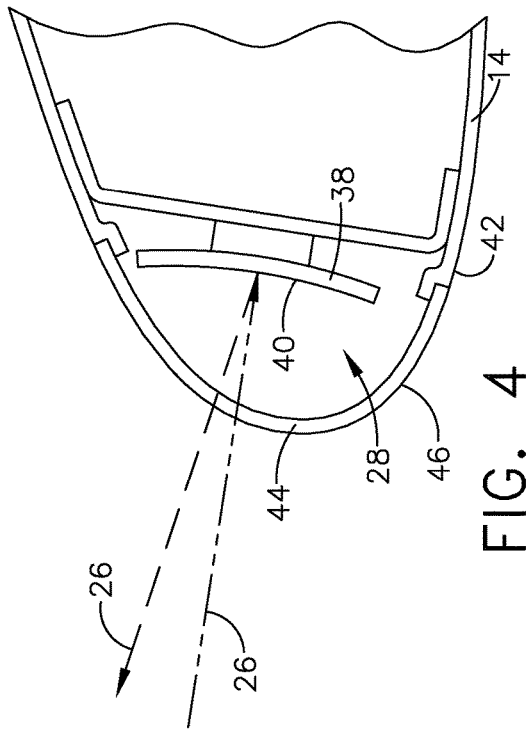
FIG. 4 is a schematic cross section side profile view of a leading edge of a wing with a first embodiment of a laser beam target device positioned spaced apart from a cross section view of a second transparent panel conformed to an outer surface of the wing.
Figure 5:
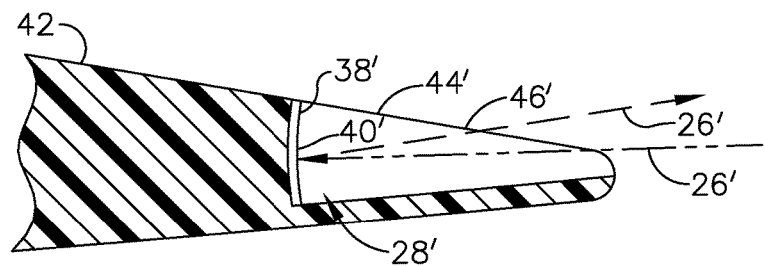
FIG. 5 is a schematic cross section side profile view of a trailing edge of a wing with the first embodiment of the laser beam target device positioned spaced apart behind a second transparent panel conformed to the outer surface of the wing.

As mentioned above, laser 22 and laser 22' are both similar in construction to one another in this example. Laser 22 emits laser beam 26 onto laser beam target device 28 secured to wing 14 on leading edge 18 and laser 22' emits laser beam 26' onto laser beam target device 28' secured to wing 14 on trailing edge 20. Laser beam target devices 28 and 28' are also similar in construction with respect to one another. Two embodiments of laser beam target devices 28 and 28' will be described herein. Regardless of which embodiment is employed, a difference between laser beam target devices 28 and 28', would be if needed, a difference in size. Laser beam target device 28' is accommodated within trailing edge 20 of wing 14 and that portion of wing 14 often has less room for accommodating laser beam target device 28' in contrast to more room being available within wing 14 along leading edge 18 for accommodating laser beam target device 28. Light beam target devices 28 and 28' and their installation within wing 14, will be discussed in further detail herein with respect to a first embodiment of light beam target devices 28 and 28', as seen in FIGS. 4 and 5, respectively. A second embodiment of light beam target devices 28 and 28' will also be discussed herein and will be seen in FIGS. 10 and 11, respectively.

In referring to FIG. 2, the first example of the laser, laser 22 is positioned at first location 24, as shown in FIG. 1. Laser 22 is positioned spaced apart from outer surface 32 of fuselage 12. First transparent panel 34, constructed of a material such as plexiglass or other suitable clear material with a low refraction is positioned spaced apart from and positioned in an overlying relationship to laser 22. Surface 36 of first transparent panel 34 conforms to surface 32 of fuselage 12 so as not to create any additional drag to aircraft 10 during flight. This construction and positioning of laser 22 at first location 24 with respect to fuselage 12 is similar in construction and positioning for the second example of the laser, laser 22', which is located at second location 30 with respect to fuselage 12, which is referred to in FIG. 3.

In referring to FIG. 3, aircraft 10 is shown with monitoring system 16 utilizing the first embodiment of laser beam target devices 28 and 28'. Laser beam 26 is emitted from laser 22 from first location 24 onto laser beam target device 28. Laser beam targeting device 28, as seen in FIG. 4, includes reflector 38 with reflective surface 40. Reflector 38 is constructed from one of a variety of shapes and in this example is concave. Reflector 38 is selected from one of a variety of reflectors such as for example a corner reflector or spherical reflector and has reflective surface 40 constructed of a polished metal finish or other suitable laser reflective surfaces. Reflector 38, as seen in FIG. 4, is positioned spaced apart from outer surface 42 of wing 14. Second transparent panel 44 constructed of one of a variety of materials such as plexiglass or other suitable clear material with a low refraction is positioned spaced apart from and positioned in an overlying relationship to reflector 38. Surface 46 of second transparent panel 44 conforms to an outer surface 42 of wing 14 so as not to create additional drag to aircraft 10 during flight. Laser beam 26 is emitted from laser 22 onto reflective surface 40 and laser beam 26 is reflected back toward fuselage 12 to third location 48 on fuselage 12 positioned, in this example, forward of wing 14, as seen in FIG. 3.

Similarly, with respect to the second example of the laser, laser 22' emits laser beam 26' from second location 30, as seen in FIG. 3, and onto laser beam target device 28', as seen in FIG. 5, positioned at trailing edge 20 of wing 14. In referring to FIG. 5, laser beam target device 28' includes reflector 38' with reflective surface 40'. Reflector 38' and reflective surface 40' are similarly constructed as described above for reflector 38 and reflective surface 40. As seen in this example, reflector 38' is slightly smaller than reflector 38, so as to accommodate the available space within trailing edge 20 of wing 14. Second transparent panel 44' is positioned spaced apart from and positioned in an overlying relationship to reflector 38'. Surface 46' of second transparent panel 44' conforms to an outer surface 42 of wing 14 so as not to create additional drag to aircraft 10 during flight. Laser beam 26' is emitted from laser 22' onto reflective surface 40' and laser beam 26' is reflected back toward fuselage 12 to fourth location 50 on fuselage 12 positioned, in this example, aft of wing 14, as seen in FIG. 3.

In referring to FIGS. 3-5, monitoring system 16 further, in this example, includes a fuselage light beam locating sensors 52 and 52'. Locating sensors 52 and 52' are each secured to fuselage 12 at third and fourth locations 48 and 50 respectively, as referred to in FIG. 3. Locating sensor 52 is positioned in optical alignment with reflective surface 40 of reflector 38 and locating sensor 52' is positioned in optical alignment with reflective surface 40' of reflector 38'. Fuselage light beam locating sensor 52, in this example, positioned at third location 48 forward of wing 14, receives reflected laser beam 26 that has reflected from reflective surface 40 of reflector 38. Similarly, fuselage light beam locating sensor 52', in this example, positioned at fourth location 50 aft of wing 14, receives reflected laser beam 26' that has reflected from reflective surface 40' of reflector 38'.

Figure 6:
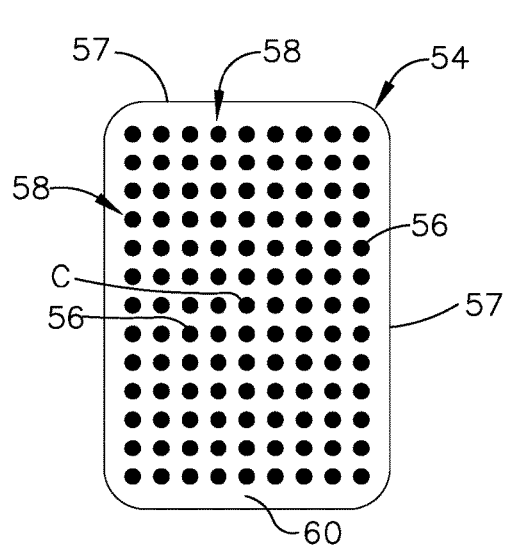
FIG. 6 is a schematic planar view of a photo-diode light beam locating sensor.

An example of fuselage light beam locating sensors 52 and 52' can be seen in FIG. 6 as a photo-diode light beam locating sensor 54. Locating sensor 54 includes a plurality of diodes 56 which are positioned into arrays 58 on panel 60. In the operation of monitoring system 16, laser beam, such as laser beam 26, is reflected onto a particular diode of plurality of diodes 56 on panel 60 of locating sensor 52. The particular diode, in turn, senses the presence of reflected laser beam 26.

In this example, each diode of the plurality of diodes 56 of panel 60 of locating sensor 52 correlates to a different position on reflective surface 40 of reflector 38 and correlates to a particular location on wing 14 located at a predetermined location at leading edge 18 of wing 14.

The change of positions of particular diodes on panel 60 sensing laser beam 26 reflected from reflective surface 40 indicates movement of wing 14 has taken place and identifies the change in position of wing 14 from which a deflection position can be ascertained. Thus, for example, monitoring system 16 is started at a referenced initial or non-deflected position for wing 14, such as with aircraft 10 at rest on the ground. As aircraft 10 takes flight and wings 14 flex the change of positions of reflective surface 40 of reflector 38 take place at the predetermined location on wing 14. This change of position of reflective surface 40 will be sensed by a different diode sensing the presence of reflected laser beam 26.

The newly sensing diode of diodes 56 identifies the position of reflector 38 on wing 14 at the predetermined location and identifies a corresponding position of wing 14. This newly sensing diode thereby provides detection of movement of wing 14 at the predetermined location on wing 14 and provides identification of the new position attained by wing 14. This data will be communicated to a controller, as will be discussed below, which will ascertain the deflection of the wing and will also determine the changed location of locating sensor 52 which will be discussed below with respect to adjusting the laser to maintain the laser beam emitting onto reflector 38. Fuselage light beam locating sensor 52 provides detection of movement and location of the position attained by wing 14 from ascertaining the deflection of wing 14 at the predetermined location on wing 14. This is similar to the operation of fuselage light beam locating sensor 52', wherein each diode of the plurality of diodes 56 on panel 60 of locating sensor 52' correlates to a position on reflective surface 40' of reflector 38' and correlates to a position on wing 14 at a predetermined location at trailing edge 20 of wing 14. Locating sensor 52' likewise provides detection of movement and location of the position attained by wing 14 from ascertaining the deflection of wing 14 at the predetermined location of reflector 38' on trailing edge 20 on wing 14.

Figure 7:
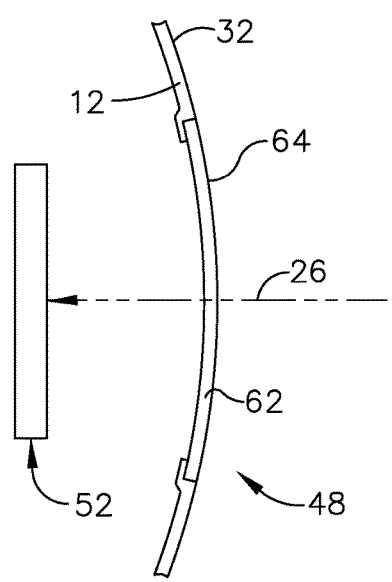
FIG. 7 is a schematic cross section side profile view of a fuselage light beam locating sensor secured to the fuselage of the aircraft and positioned spaced apart from a third transparent panel conformed to the outer surface of the fuselage of the aircraft.

In referring to FIG. 7, fuselage light beam locating sensor 52 is positioned spaced apart from outer surface 32 of fuselage 12. Third transparent panel 62 is positioned spaced apart from and positioned in an overlying relationship to fuselage light beam locating sensor 52. Third transparent panel 62 is constructed of one of a variety of materials such as plexiglass or other suitable clear material with a low refraction. Surface 64 of third transparent panel 62 conforms to outer surface 32 of fuselage 12 so as not to create additional drag during flight of aircraft 10. The installation and construction of fuselage light beam locating sensor 52' located at fourth location 50, as indicated in FIG. 3 and not shown in detail, is similar in construction and installation with respect to fuselage 12 to that of locating sensor 52 as shown in FIG. 7. Locating sensor 52' is positioned and secured as shown for locating sensor 52 in FIG. 7 and locating sensor 52' receives reflected laser beam 26' as is shown for reflected laser beam 26 being received by locating sensor 52 in FIG. 7.

Monitoring system 16 further includes gimbal 66, as seen in FIG. 2, which includes controller 68. In the example shown in FIG. 2, laser 22 is secured to gimbal 66 wherein gimbal 66 adjusts positioning of laser 22 and laser beam 26, as will be discussed. Laser 22 is secured to fuselage 12 with gimbal 66 secured to fuselage 12. Fuselage light beam locating sensor 52 is communicatively coupled to controller 68 of gimbal 66 by wire or wireless communication. A second example of laser used in monitoring system 16 in this example includes laser 22'. As mentioned earlier, laser 22' is similarly secured to fuselage 12 as described for laser 22 and as shown in FIG. 2. Laser 22' is, in this example, secured to a gimbal which includes a controller as shown for laser 22 in FIG. 2 being secured to gimbal 66 having controller 68. Similarly, laser 22' is secured to fuselage 12 with a gimbal such as gimbal 66 secured to fuselage 12 in FIG. 2 with respect to laser 22. Fuselage light beam locating sensor 52' is likewise communicatively coupled to the controller of the gimbal associated with laser 22' such as locating sensor 52 is communicatively coupled to controller 68 of gimbal 66 associated with laser 22.

Locating sensors 52 and 52' communicate to the controller of the gimbals secured to lasers 22 and 22' respectively. Locating sensors 52 and 52', based on receiving the reflected laser beams 26 and 26', respectively, provide information, with respect to the detection of the movement of and the position of wing 14 at the predetermined locations of reflective surfaces 40 and 40', respectively, to the controllers of the gimbals secured to lasers 22 and 22'. With the position detected of wing 14 at predetermined locations of reflectors 38 and 38', the deflection of the wing at these locations can be ascertained. This information also provides the controllers the location of reflective surfaces 40 and 40'. Also, with the information provided to the controller of the position, for example, of laser beam 26 on locating sensor 52 and laser beam 26' on locating sensor 52', the controller provides appropriate instruction to the gimbal associated with the controller and the gimbal accordingly adjusts the position of lasers 22 and 22' to keep laser beams 26 and 26' respectively aligned with reflective surfaces 40 and 40'. Maintaining alignment of lasers 22 and 22' with reflectors 38 and 38' respectively allows monitoring system 16 to continue to operate to detect and ascertain the deflected positions of wing 14. If reflective surfaces 40 and 40' move based on the deflection of wing 14 at the predetermined locations of reflective surfaces 40 and 40', such that laser beams 26 and 26' no longer are reflected by reflective surfaces 40 and 40', respectively, laser beams 26 and 26' will not be reflected onto locating sensors 52 and 52' and monitoring system 16 will no longer operate. The adjustments of positions of lasers 22 and 22' by their associated gimbals secured to lasers 22 and 22' maintain laser beams 26 and 26' aligned with reflective surfaces 40 and 40' respectively.

These adjustments made to the positions of lasers 22 and 22' and their corresponding laser beams 26 and 26', are taken into account in ascertaining the deflection of wing 14 at the predetermined locations associated with reflective surfaces 40 and 40'. At the same time, the adjustments to lasers 22 and 22' permit monitoring system 16 to continue to operate and provide detection of the movement of wing 14 and the position of wing 14 at the predetermined locations so as to ascertain the deflection of wing 14.

Figure 8:
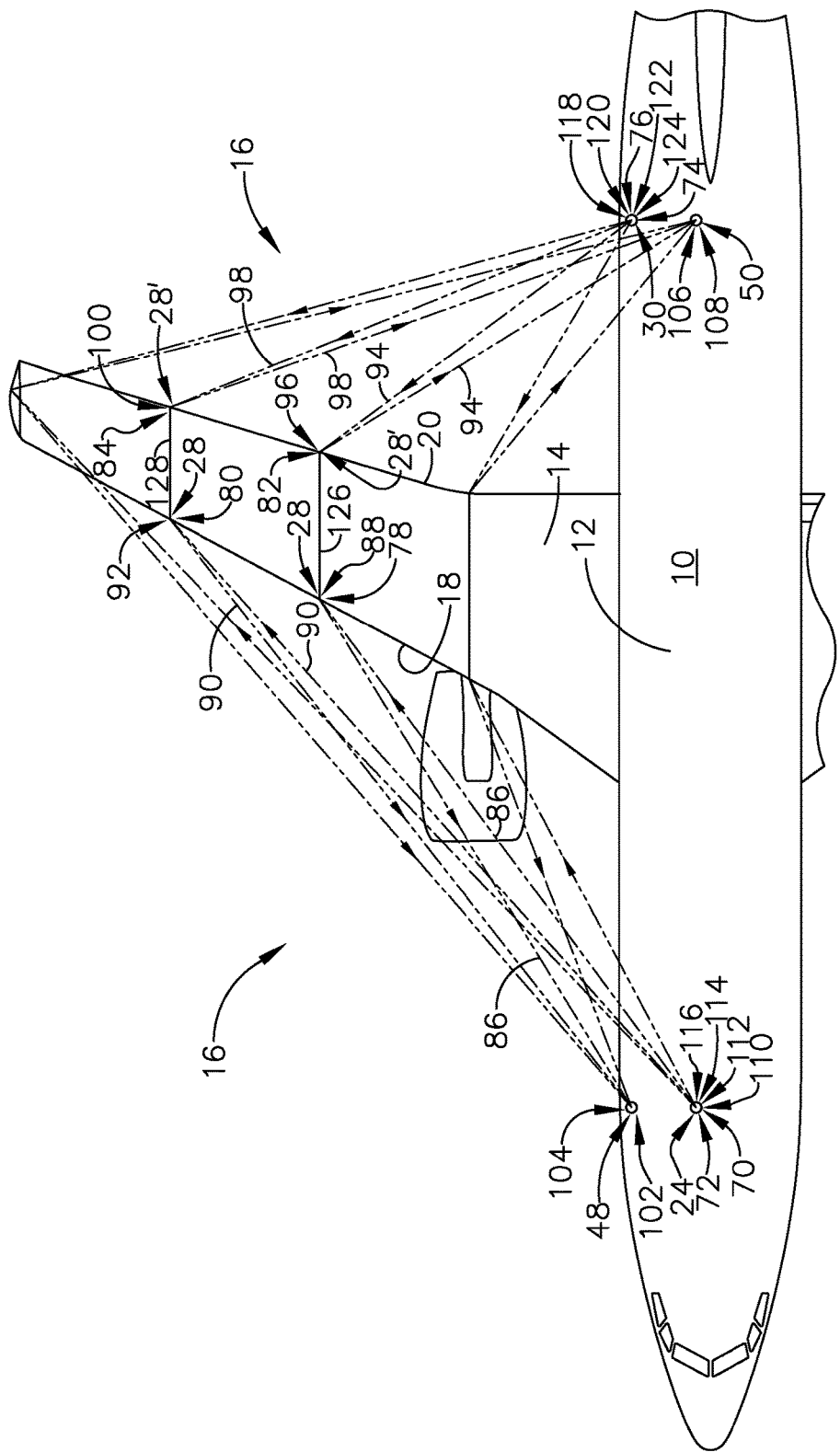
FIG. 8 is a partial schematic top plan view of an aircraft showing laser beams originating from the fuselage emitted onto a first embodiment of the laser beam target devices positioned along the leading and trailing edges of a wing with the laser beams reflected back toward the fuselage of the aircraft.

In referring to FIG. 8, aircraft 10 is schematically shown utilizing monitoring system 16 which employs first embodiment of laser beam target devices 28 and 28', as were described above. Laser beam target devices 28 and 28' are positioned at predetermined locations along leading edge 18 of wing 14 and along trailing edge 20 of wing 14, respectively. Laser beam target device 28, as shown in FIG. 4 includes employing reflector 38 having reflective surface 40 and laser beam target device 28', as shown in FIG. 5 includes employing reflector 38' having reflective surface 40'.

In the example of monitoring system 16 shown in FIG. 8, first and second lasers 70, 72 are secured to fuselage 12 located at first location 24 forward of the wing 14 of the aircraft 10. First and second lasers 70, 72 are constructed and installed in aircraft 10 similar to that of laser 22 shown in FIG. 2. Third laser and fourth laser 74, 76 are secured to the fuselage 12 at second location 30 aft of wing 14 of aircraft 10. Third and fourth lasers 74, 76 are constructed and installed in aircraft 10 similar to that of laser 22 as shown in FIG. 2.

This example of monitoring system 16 utilizes first embodiment of laser beam targets 28 and 28' as described above and shown in FIGS. 4 and 5. Laser beam targets 28 include first reflector 78 and second reflector 80 which are each constructed and secured to wing 14 of aircraft 10 as seen with respect to reflector 38 shown in FIG. 4. First reflector 78 and second reflector 80 are located spaced apart from each other along leading edge 18 of wing 14. Third reflector 82 and fourth reflector 84 are each constructed and secured to wing 14 of aircraft 10 as seen for reflector 38' shown in FIG. 5. Third reflector 82 and fourth reflector 84 are located spaced apart from each other along trailing edge 20 of wing 14.

Monitoring system 16, as shown in FIG. 8, further includes a laser beam being emitted from each laser. First laser beam 86 is emitted from first laser 70 such as seen for example in FIG. 2 as laser beam 26 is emitted from laser 22. First laser 70 is positioned to emit first laser beam 86 onto first reflective surface 88 of first reflector 78 wherein first reflective surface 88 reflects first laser beam 86, such as seen in FIG. 4 where laser beam 26 emitted from laser 22 is reflected by reflective surface 40 of reflector 38. Second laser beam 90 is emitted from second laser 72 such as seen for example in FIG. 2 as laser beam 26 is emitted from laser 22. Second laser 72 is positioned to emit second laser beam 90 onto second reflective surface 92 of second reflector 80 wherein second reflective surface 92 of second reflector 80 reflects second laser beam 90 such as seen in FIG. 4 where laser beam 26 emitted from laser 22 is reflected by reflective surface 40 of reflector 38. Additional undesignated lines extending between fuselage 12 and wing 14 in FIG. 8 are additional laser beams and reflected laser beams that are employed in this particular example.

Third laser beam 94 emitted from third laser 74 such as seen for example in FIG. 2 as laser beam 26 emitted from laser 22. Third laser 74 is positioned to emit third laser beam 94 onto third reflective surface 96 of third reflector 82 wherein third reflective surface 96 reflects third laser beam 94 such as seen in FIG. 5 where laser beam 26' emitted from laser 22' is reflected by reflective surface 40' of reflector 38'. Fourth laser beam 98 emitted by fourth laser 76 such as seen for example in FIG. 2 as laser beam 26 is emitted from laser 22. Fourth laser 76 is positioned to emit fourth laser beam 98 onto fourth reflective surface 100 of fourth reflector 84 wherein fourth reflective surface 100 reflects fourth laser beam 98 such as seen in FIG. 5 where laser beam 26' emitted from laser 22' is reflected by reflective surface 40' of reflector 38'.

Monitoring system 16 further includes fuselage light beam locating sensors which are secured to fuselage 12. First fuselage light beam locating sensor 102 and second fuselage light beam locating sensor 104 are located forward of the wing 14 of the aircraft 10 at third location 48. Both first and second locating sensors 102 and 104 are similar in construction and installation as that of fuselage light beam locating sensor 52 as shown in FIG. 7 and for this example are constructed as photo-diode light beam locating sensor 54 as shown in FIG. 6. First fuselage light beam locating sensor 102 is positioned in optical alignment with the first reflective surface 88 of first reflector 78 and receives first laser beam 86 which reflects from first reflective surface 88 of first reflector 78. Second fuselage light beam locating sensor 104 is positioned in optical alignment with second reflective surface 92 of second reflector 80 and receives second laser beam 90 which reflects from second reflective surface 92 of second reflector 80.

Third fuselage light beam locating sensor 106 and fourth fuselage light beam locating sensor 108 are located aft of wing 14 of aircraft 10 at fourth location 50. Both third and fourth locating sensors 106 and 108 are similar in construction and installation as that of fuselage light beam locating sensor 52 as shown in FIG. 7 and for this example are constructed as photo-diode light beam locating sensor 54 as shown in FIG. 6. Third fuselage light beam locating sensor 106 is positioned in optical alignment with third reflective surface 96 of third reflector 82 and receives third laser beam 94 which reflects from third reflective surface 96 of third reflector 82. Fourth fuselage light beam locating sensor 108 is positioned in optical alignment with fourth reflective surface 100 of fourth reflector 84 and receives fourth laser beam 98 which reflects from fourth reflective surface 100 of fourth reflector 84.

Monitoring system 16, in this example, further includes gimbals wherein each gimbal has a controller, each gimbal is secured to a laser and in turn each gimbal is secured to fuselage 12. Each fuselage light beam locating sensor is communicatively coupled to a controller of a gimbal secured to a laser which emits a laser beam. The laser beam is reflected onto the light beam locating sensor associated with the laser which emitted the laser beam. First gimbal 110 includes controller 112 and first gimbal 110 is secured to first laser 70. First laser 70 is secured to fuselage 12 with first gimbal 110 secured to fuselage 12. First fuselage light beam locating sensor 102 is communicatively coupled to controller 112 of first gimbal 110. Second gimbal 114 includes controller 116 and second gimbal 114 is secured to second laser 72. Second laser 72 is secured to fuselage 12 with second gimbal 114 secured to fuselage 12. Second fuselage light beam locating sensor 104 is communicatively coupled to controller 116 of second gimbal 114.

Third gimbal 118 includes controller 120 and third gimbal 118 is secured to third laser 74. Third laser 74 is secured to fuselage 12 with third gimbal 118 secured to fuselage 12. Third fuselage light beam locating sensor 106 is communicatively coupled to controller 120 of third gimbal 118. Fourth gimbal 122 includes controller 124 and fourth gimbal 122 is secured to fourth laser 76. Fourth laser 76 is secured to fuselage 12 with fourth gimbal 122 secured to fuselage 12. Fourth fuselage light beam locating sensor 108 is communicatively coupled to controller 124 of fourth gimbal 122.

Monitoring system 16 positions the reflectors at predetermined locations on wing 14. In this example, first reflector 78 is positioned on leading edge 18 of wing 14 and third reflector 82 is positioned on trailing edge 20 of wing 14 wherein both first and third reflectors 78, 82 are located on a first chord 126 of the wing 14. With monitoring and detecting movement and position of wing 14 at these two predetermined locations on wing 14, not only will the deflection of wing 14 at these two predetermined locations be ascertained but also a difference in deflection between these two predetermined locations will be ascertained as well. In determining the difference in the deflection between these two predetermined locations, a twist in wing 14 at the position of chord 126 relative to fuselage 12 is ascertained.

Similarly, in this example, second reflector 80 is positioned on leading edge 18 of wing 14 and fourth reflector 84 is positioned on trailing edge 20 of wing 14 wherein both second and fourth reflectors 80, 84 are located on a second chord 128 of the wing 14. With monitoring and detecting movement and position of wing 14 at these two predetermined locations on wing 14, the user will be able to ascertain the deflection of wing 14 at these two predetermined locations be ascertained but also a difference in deflection between these two predetermined locations will be ascertained as well. In determining the difference in the deflection between these two predetermined locations, a twist in wing 14 at the position of chord 128 relative to fuselage 12 is ascertained.

Figure 9:
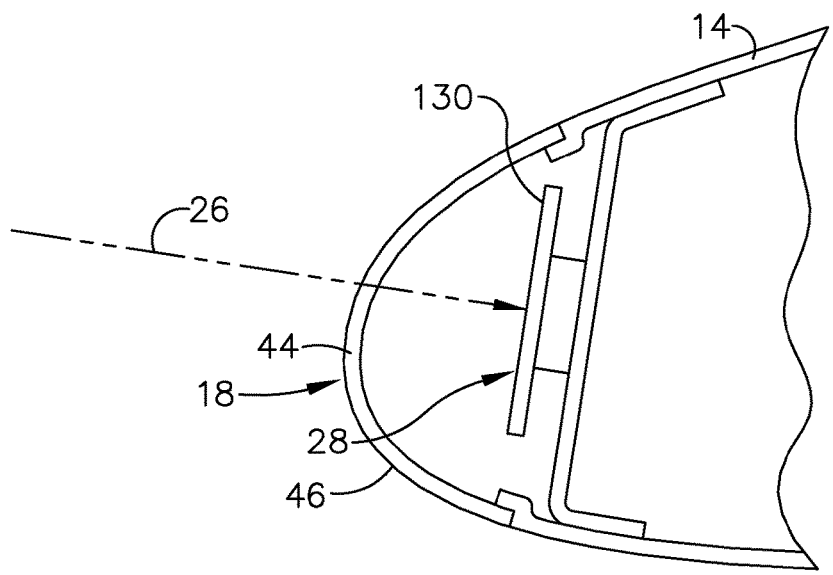
FIG. 9 is a schematic cross section side profile view of a leading edge of a wing with a second embodiment of the laser beam target device positioned spaced apart from a cross section view of a second transparent panel conformed to an outer surface of the wing.
Figure 10:
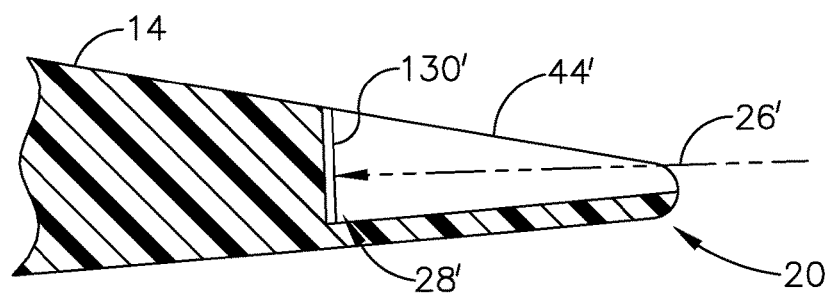
FIG. 10 is a schematic cross section side profile view of a trailing edge of a wing with the second embodiment of the laser beam target device positioned spaced apart from a cross section view of the second transparent panel conformed to an outer surface of the wing.

In referring to FIGS. 9 and 10, monitoring system 16 employs a second embodiment of laser beam target devices 28 an 28'. For example in FIG. 9, laser beam 26 is emitted from laser 22 from first location 24 onto laser beam target 28. Laser beam target device 28 in FIG. 9 includes wing light beam locating sensor 130 at a predetermined location in leading edge 18 of wing 14. Wing light beam locating sensor 130, in this example, includes photo-diode light beam locating sensor 54, as seen in FIG. 6.

Locating sensor 130 is installed into wing 14 similarly as that for the first embodiment of laser beam target device 28 which included reflector 38 as shown in FIG. 4. In this embodiment, however, laser beam 26 is not reflected but is sensed by a diode from the plurality of diodes 56 positioned on panel 60. Each diode of the plurality of diodes 56 corresponds to a particular position on wing 14.

With a diode of sensor 130 sensing laser beam 26, a particular location on the wing is identified. Wing light beam locating sensor 130 is communicatively coupled to a controller such as controller 68 associated with a gimbal such as gimbal 66, as shown in FIG. 2. In that example, gimbal 66 is secured to laser 22 and laser 22 is secured to fuselage 12 with gimbal 66 secured to fuselage 12. Wing light beam locating sensor 130 communicates the identified position of the position of the diode that sensed laser beam 26 to a controller such as controller 68 by wire or by wireless communications.

With movement of wing 14 at the predetermined location of sensor 130, a different diode senses laser beam 26. The change of position of a particular diode on panel 60 which senses laser beam 26 indicates movement of wing 14 and identifies the change in position of wing 14 from which a deflection position can be ascertained. Thus, for example, monitoring system 16 is started at a referenced initial or non-deflected position for wing 14, such as with aircraft 10 at rest on the ground. As aircraft 10 takes flight and wings 14 flex the change of position of sensor 130 results in a different diode sensing laser beam 26. The diode that senses laser beam 26 corresponds to a different position on wing 14 and that position is identified.

The newly sensing diode of the plurality of diodes 56 identifies a new position on wing 14 at the predetermined location. This newly sensing diode thereby provides detection of movement of wing 14 at the predetermined location on wing 14 and provides identification of the new position attained by wing 14. This data will be communicated to controller 68, as will be discussed below, which will ascertain the deflection of the wing and will also determine the location of sensor 130.

The information provided to controller 68 by sensor 130 allows the controller to detect and ascertain the deflection of wing 14 taking place. Also at the same time this information can determine the location of sensor 130 so as to permit controller 68 to instruct the gimbal 66 to adjust the position of laser 22 and the direction of laser beam 26 so as to maintain laser beam 26 emitting onto sensor 130. These adjustments are taken into account in ascertaining the deflection of the wing at the location of sensor 130. The adjustments made to laser 22 will maintain the operation of monitoring system 16 with laser beam 26 remaining on sensor 130.

In referring to FIG. 10, second embodiment of laser beam target device 28' includes wing light beam locating sensor 130' which operates in the same way as locating sensor 130. Light beam locating sensor 130' is slightly smaller in size than locating sensor 130 so as to accommodate locating sensor 130' within trailing edge 20 of wing 14. Light beam 26' is sensed by a diode from plurality of diodes 56. With locating sensor 130' being communicatively coupled with a controller of a gimbal which secures laser 22' to fuselage 12, the position information of the diode is communicated to the controller which corresponds to a position on wing 14 and the controller in turn can determine deflection of wing 14 at the position of locating sensor 130' and determine the position of the locating sensor 130' as well.

Figure 11:
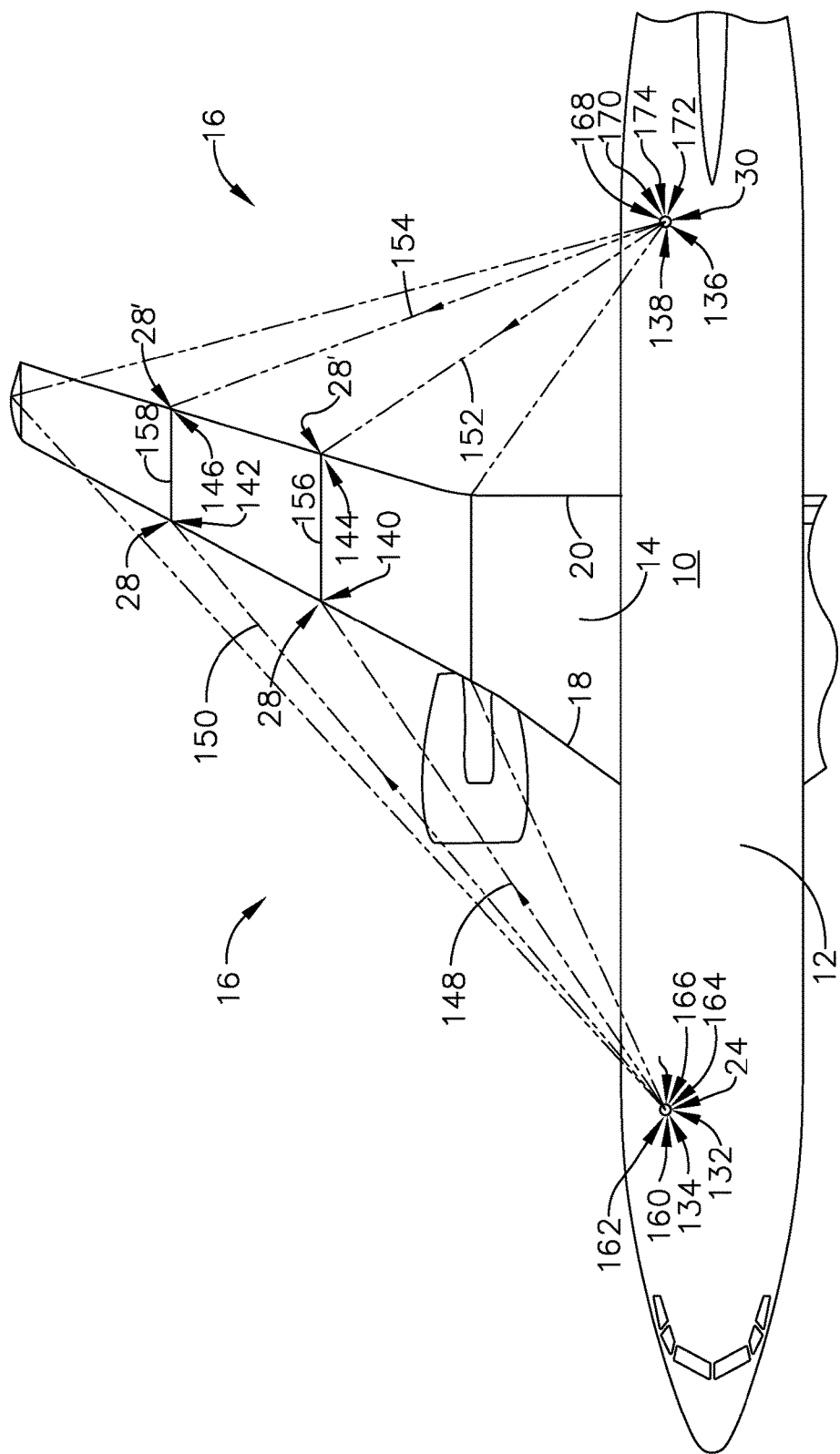
FIG. 11 is a partial schematic top plan view of an aircraft showing laser beams originating from the fuselage onto a second embodiment of the laser beam target devices positioned along the leading and trailing edges of a wing with the laser beams.

In referring to FIG. 11, aircraft 10 is schematically shown utilizing monitoring system 16 which employs second embodiment of laser beam target devices 28 and 28'. Laser beam target devices 28 and 28' are positioned at predetermined locations along leading edge 18 and along trailing edge 20 of wing 14, respectively. Second embodiment of laser beam target device 28 is shown in FIG. 9 which includes wing light beam locating sensor 130 and second embodiment of laser beam target device 28' is shown in FIG. 10 which includes wing light beam locating sensor 130'. Wing light beam locating sensors 130 and 130' are each, for example, photo-diode light beam locating sensor 54 as shown in FIG. 6.

In the example of monitoring system 16 referred to in FIG. 11, fifth and sixth lasers 132, 134 are secured to fuselage 12 located at first location 24 forward of the wing 14 of the aircraft 10. Fifth and sixth lasers 132, 134 are constructed and installed in aircraft 10 similar to that of laser 22 shown in FIG. 2. Seventh laser and eighth laser 136, 138 are secured to the fuselage 12 at second location 30 aft of wing 14 of aircraft 10. Seventh and eighth lasers 136, 138 are constructed and installed in aircraft 10 similar to that of laser 22 as shown in FIG. 2.

Monitoring system 16 further includes, wing light beam locating sensors. First wing light beam locating sensor 140 is secured to wing 14 of aircraft 10 and second wing light beam locating sensor 142 is secured to wing 14 of aircraft 10. First wing light beam locating sensor 140 and second wing light beam locating sensor 142 are located spaced apart from each other along leading edge 18 of wing 14. Third wing light beam locating sensor 144 is secured to wing 14 of aircraft 10 and fourth wing light beam locating sensor 146 is secured to wing 14 of aircraft 10. Third wing light beam locating sensor 144 and the fourth wing light beam locating sensor 146 are located spaced apart from each other along trailing edge 20 of wing 14.

In monitoring system 16, as shown in FIG. 11, a laser beam is emitted onto the wing light beam locating sensors. Fifth laser beam 148 is emitted from the fifth laser 132 wherein fifth laser 132 is positioned such that fifth laser beam 148 is emitted onto first wing light beam locating sensor 140. Sixth laser beam 150 is emitted from sixth laser 134 wherein sixth laser 134 is positioned such that sixth laser beam 150 is emitted onto second wing light beam locating sensor 142. Seventh laser beam 152 is emitted from seventh laser 136 wherein seventh laser 136 is positioned such that seventh laser beam 152 is emitted onto third wing light beam locating sensor 144. Eighth laser beam 154 is emitted from eighth laser 138 wherein eighth laser 138 is positioned such that eighth laser beam 154 is emitted onto fourth wing light beam locating sensor 146. Additional undesignated lines extending between fuselage 12 and wing 14 in FIG. 11 include additional lasers emitted from their respective location on fuselage 12 to a wing light beam locating sensor positioned on wing 14 for this example.

As wing 14 flexes during flight, the laser beam will be sensed by different diodes of the plurality of diodes 56 of wing light beam locating sensors. Each diode corresponds to a different position on wing 14 and as will be described below that information will be communicated to a controller that corresponds to the laser emitting the laser beam being sensed by a particular diode. The controller will ascertain the deflection at the predetermined location of wing light beam locating sensor and will also determine the location of the locating sensor so as to provide commands to the gimbal associated with the laser and adjust the position of the laser so as to maintain the laser beam positioned on wing light beam locating sensor. These adjustments will be taken into account in determining the deflection at that location.

Additionally, first wing light beam locating sensor 140 and third wing light beam locating sensor 144 are located on third chord 156 of wing. Second wing light beam locating sensor 142 and fourth wing light beam locating sensor 146 are located on fourth chord 158 of wing 14. As discussed earlier for first embodiment of light beam target devices employed in FIG. 8, with obtaining deflection data from two different locations on the same chord, a determination of the twist orientation of wing 14 relative to fuselage 12 can be made at the location of that particular chord.

Monitoring system 16 as shown in FIG. 11 further includes employing gimbals. Each laser is secured to a gimbal wherein the gimbal is secured to fuselage 12 securing the laser to the fuselage. Each gimbal has a controller.

Each wing light beam locating sensor is communicatively coupled to a controller. This communication capability is facilitated by wire or by wireless connection. Fifth gimbal 160 includes controller 162 wherein fifth laser 132 is secured to fifth gimbal 160 and fifth laser 132 is secured to fuselage 12 with fifth gimbal 160 secured to fuselage 12. This installation and construction with respect to fifth gimbal 160, controller 162 and fifth laser 132 is similar to that shown in FIG. 2 for gimbal 66, controller 68 and laser 22. First wing light beam locating sensor 140 is communicatively coupled to controller 162 of fifth gimbal 160. Sixth gimbal 164 includes controller 166 wherein sixth laser 134 is secured to sixth gimbal 164. Sixth laser 134 is secured to fuselage 12 with sixth gimbal 164 secured to fuselage 12. This installation and construction with respect to sixth gimbal 164, controller 166 and sixth laser 134 is similar to that shown in FIG. 2 for gimbal 66, controller 68 and laser 22. Second wing light beam locating sensor 142 is communicatively coupled to controller 166 of sixth gimbal 164.

Seventh gimbal 168 includes controller 170 wherein seventh laser 136 is secured to seventh gimbal 168 and seventh laser 136 is secured to fuselage 12 with seventh gimbal 168 secured to fuselage 12. This installation and construction with respect to seventh gimbal 168, controller 170 and seventh laser 136 is similar to that shown in FIG. 2 for gimbal 66, controller 68 and laser 22. Third wing light beam locating sensor 144 is communicatively coupled to controller 170 of seventh gimbal 168. Eighth gimbal 172 includes controller 174 wherein eighth laser 138 is secured to eighth gimbal 172. Eighth laser 138 is secured to fuselage 12 with eighth gimbal 172 secured to fuselage 12. This installation and construction with respect to eighth gimbal 172, controller 174 and eighth laser 138 is similar to that shown in FIG. 2 for gimbal 66, controller 68 and laser 22. Fourth wing light beam locating sensor 146 is communicatively coupled to controller 174 of eighth gimbal 172.

As earlier described with respect to first through fourth fuselage light beam locating sensors 102-108, each of those sensors were communicatively coupled to a controller 112, 116, 120 and 124 respectively. This is the same arrangement with respect to first through fourth wing light beam locating sensors 140-146 each being communicatively coupled to a controller 162, 166, 170 and 174, respectively. Controllers 162, 166, 170 and 174 receive the location data from first through fourth wing light beam locating sensors 140-146 for ascertaining the deflection of wing 14 at the predetermined locations of wing light beam locating sensors 140-146. Controllers 162, 166, 170 and 174 for determining the location of first through fourth wing light beam locating sensors 140-146 so as to provide instructions to fifth through eighth gimbals 160, 164, 168 and 172 to adjust the direction of fifth through eighth lasers 132-138 for emitting fifth through eighth laser beams 148-154 onto their corresponding first through fourth wing light beam locating sensors 140-146.

Figure 12:
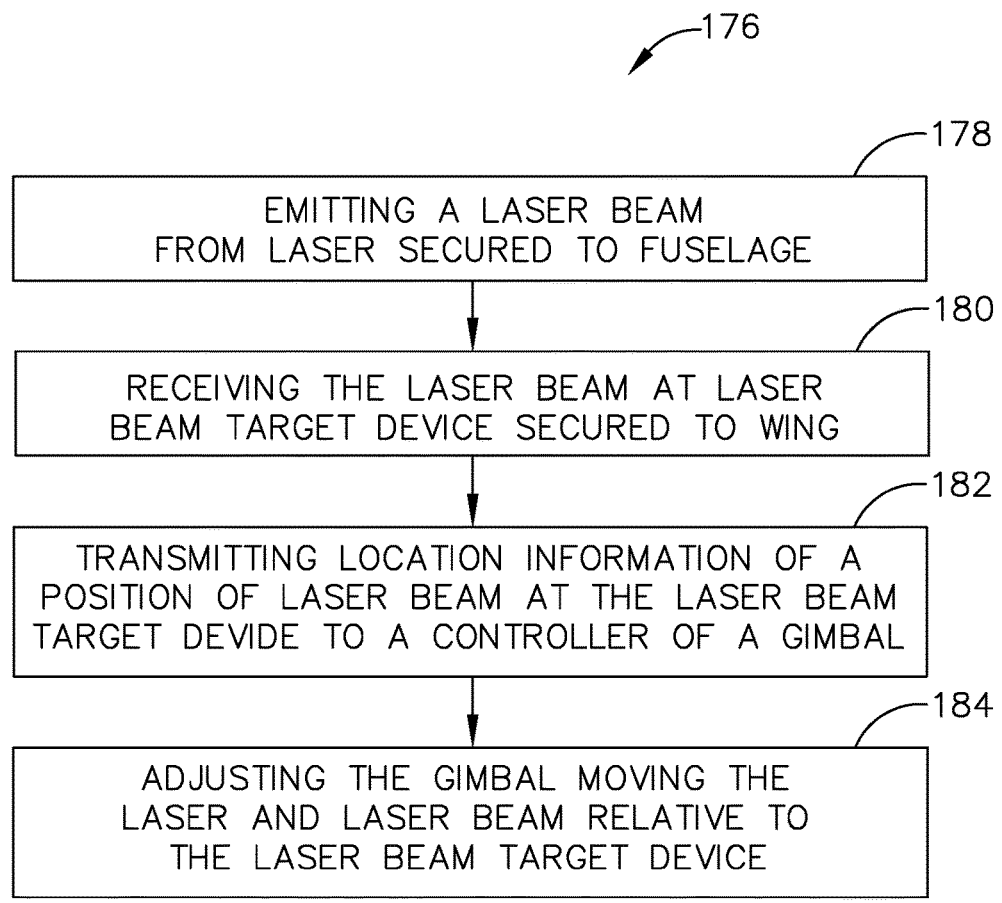
FIG. 12 is a flow chart of a method for sensing the deflection of a portion of a wing of an aircraft.

Method 176, as shown in FIG. 12, for sensing deflection of a portion of wing 14 of aircraft 10 is also provided and includes step 178 of emitting, for example, laser beam 26 from a laser 22 secured to a fuselage 12 of aircraft 10. Method 176 further includes step 180 of receiving laser beam 26 at laser beam target device 28 secured to wing 14 of aircraft 10. Method 176 further includes step 182 of transmitting location information of the position of laser beam 26 at laser beam target device 28 to controller 68 of gimbal 66 wherein gimbal 66 secures laser 22 to fuselage 12 of aircraft 10.

Method 176 in a first example includes step 180 of receiving to further include laser beam target device 28 to include reflector 38 reflecting laser beam 28 to fuselage light beam locating sensor 52 secured to fuselage 12 of aircraft 10. Reflector 38 is positioned on wing 14 at a predetermined position on wing 14. In this same first example of method 176, step 182 of transmitting further includes fuselage light beam locating sensor 52 communicating the location information of the position of laser beam 26 at reflector 38 to controller 68 of gimbal 66. The location information of the position, in this example, would be the diode 56 of fuselage light beam locating sensor 52 which senses laser beam 26, where the diode 56 corresponds to a location on reflector 38 from which the reflected laser beam 26 reflected and which also corresponds to a position on wing 14. Detecting the position on wing 14, as discussed earlier, provides the controller 68 information for determining deflection of wing 14 at the predetermined location of reflector 38.

Method 176 in a second example includes step 180 of receiving to further include laser beam target device 28 to include wing light beam locating sensor 130 secured to the wing 14. Wing light beam locating sensor 130 is positioned at a predetermined location on wing 14. In this same second example, the step 182 of transmitting further includes wing light beam locating sensor 130 communicating the location information of laser beam 26 at wing light beam locating sensor 130 to controller 68 of the gimbal 66. The location of the position, in this example, would be from the position of diode 56 of wing light beam locating sensor 52 which senses laser beam 26, where diode 56 corresponds to a position on wing 14. Detecting the position on wing 14, as discussed earlier, provides controller 68 information for determining deflection of wing 14 at the predetermined location of wing light beam locating sensor 130.

Method 176 for sensing further includes step 184 of adjusting gimbal 66 and moving laser 22 and laser beam 26 relative to laser beam target device 28. With the detection of the position on wing 14 with respect to either example discussed above, controller 68 will determine the amount and direction of movement of laser 22 needs to be made to move laser beam 26 relative to laser beam target device 28. This movement of laser 22 will maintain laser beam 26 emitting onto laser target device 28 and thereby maintaining monitoring system 16 operational. In this example, a wing will move or vibrate at a frequency of two to six Hertz (2-6 Hz) and the controller will ascertain and instruct adjustments to be made by gimbal 66 at a frequency of about one hundred Hertz (100 Hz).

Figure 13:
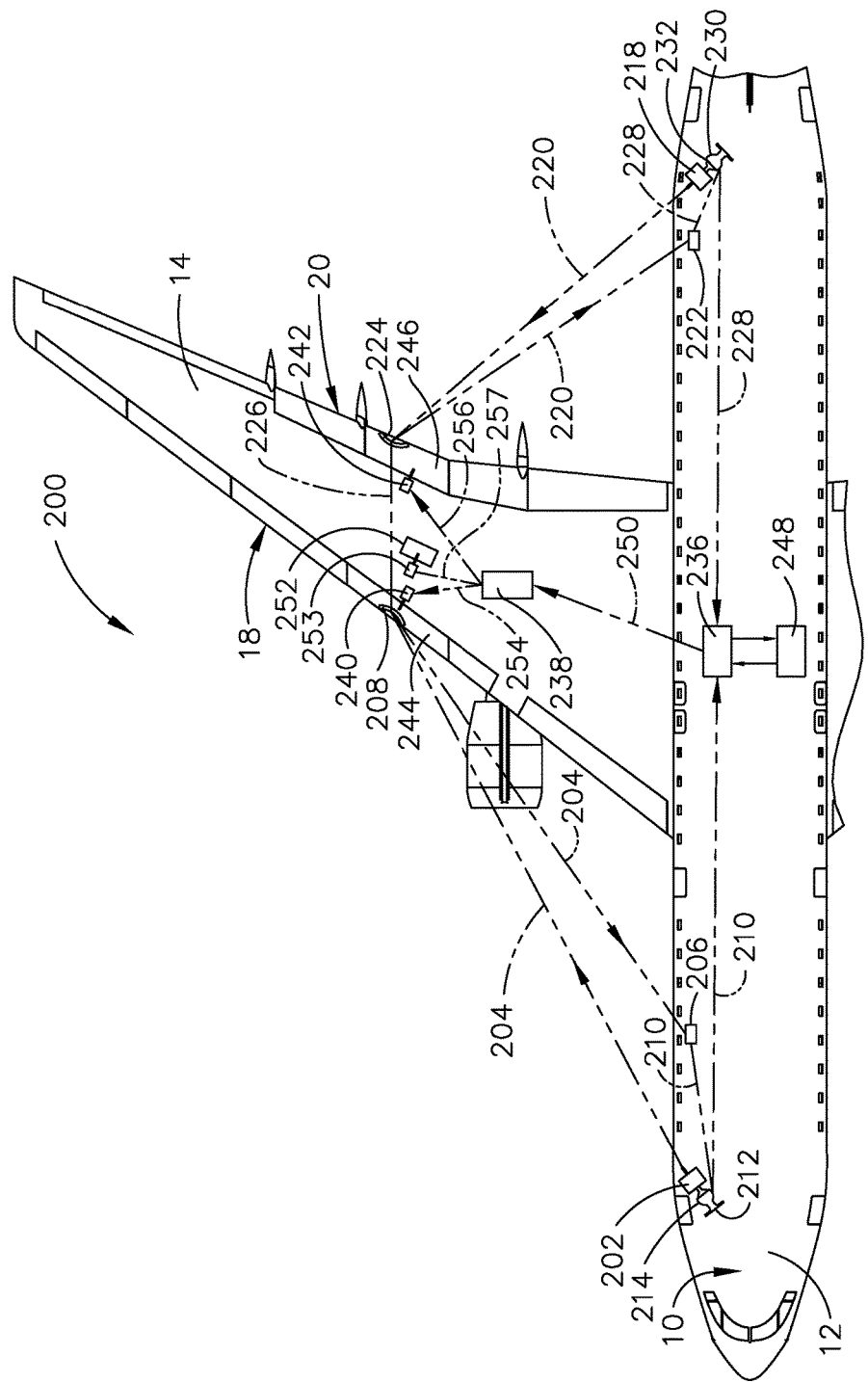
FIG. 13 is a schematic partial top plan view of the aircraft with first example of the system for correcting wing twist of an aircraft.
Figure 14:
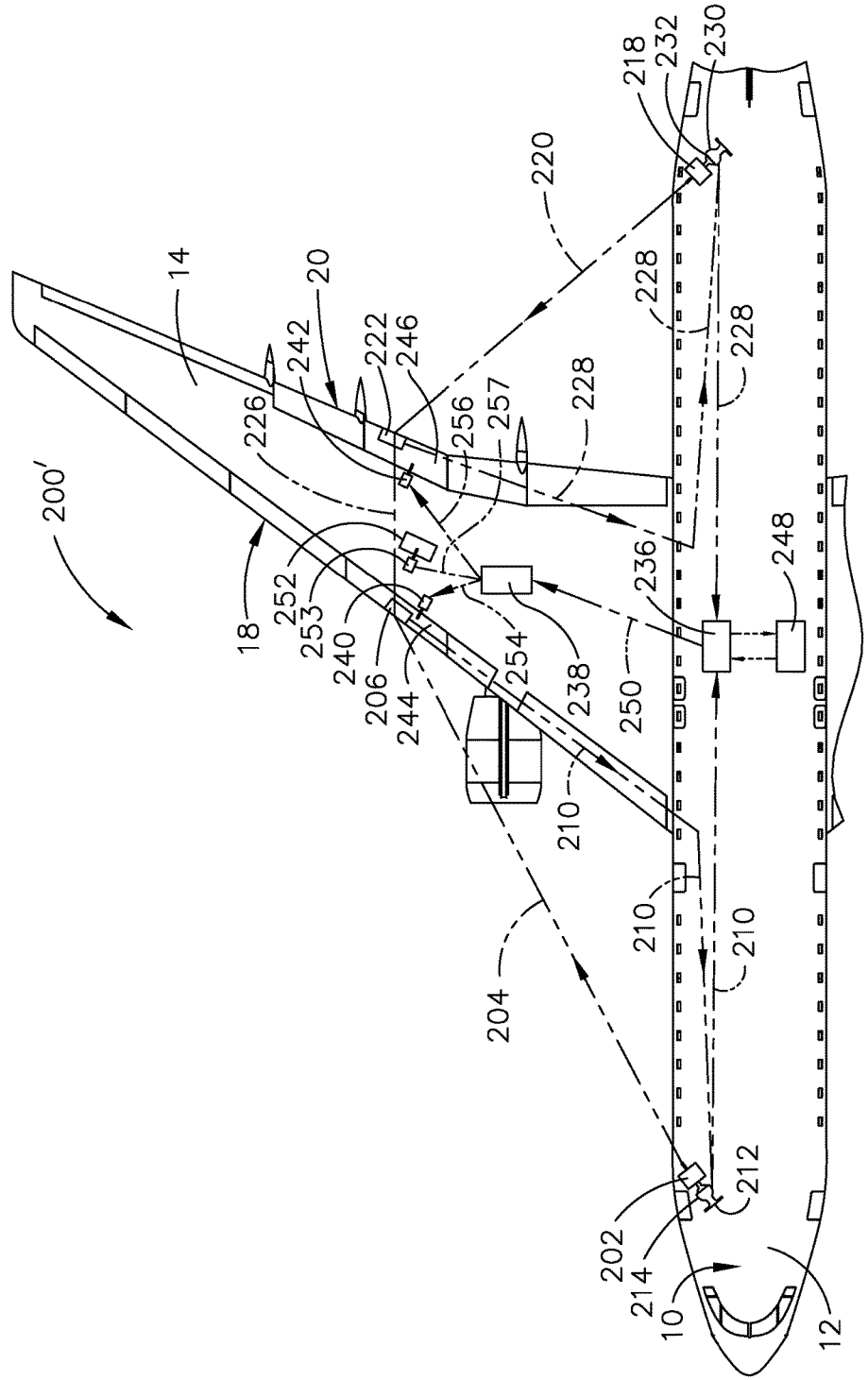
FIG. 14 is a schematic partial top plan view of the aircraft with a second example of the system for correcting wing twist of an aircraft.
Figure 15:
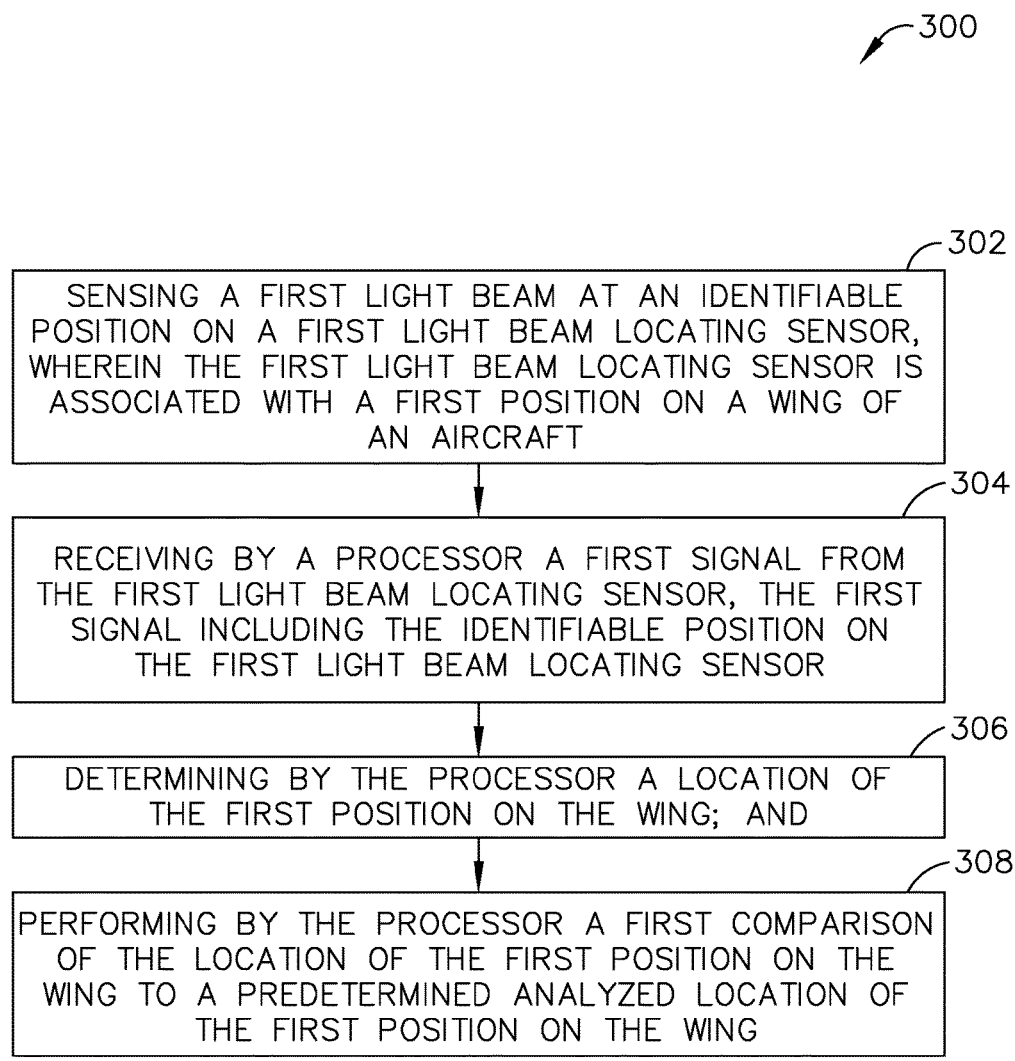
FIG. 15 is a flow chart of a method for correcting wing twist of an aircraft.

As discussed above, monitoring system 16 detects and ascertains the deflection of a leading edge 18 and a trailing edge 20 of wing 14 at a same chord of wing 14. The detection and ascertaining of the position of the leading edge 18 and the trailing edge 20 at a same chord on wing 14 provides useful data of a twist configuration of wing 14. With ascertaining the twist configuration of wing 14, this information can now be used to facilitate correcting wing twist during flight and optimize operational cost of aircraft 10. A first embodiment or system 200 for correcting wing twist for aircraft 10 will be discussed herein and is shown in FIG. 13 and a second embodiment or system 200' for correcting wing twist for aircraft 10 will also be discussed herein and is shown in FIG. 14. A method for correcting wing twist of aircraft 10 will also be discussed below and is shown in FIG. 15.

In referring to each of FIGS. 13 and 14, the numbering will be the same for first system 200 and second system 200' where the components employed and the reference positions are similar for both systems. First system 200, as seen in FIG. 13 for correcting wing twist of aircraft 10, includes utilizing monitoring system 16 as seen in FIG. 8. Second system 200', as seen in FIG. 14 for correcting wing twist of aircraft 10, includes utilizing monitoring system 16 as seen in FIG. 11. The primary difference between system 200 and second system 200' is the positioning of first light beam locating sensor 206 and second light beam locating sensor 222. In first system 200 first light beam locating sensor 206 and second light beam locating sensor 222 are positioned on fuselage 12. In contrast, in second system 200', first light beam locating sensor 206 and second light beam locating sensor 222 are positioned on wing 14.

In both first and second systems 200 and 200', first laser 202 is secured to fuselage 12 of aircraft 10 forward of wing 14. This laser is shown, for example, in further detail as laser 22 in FIG. 2 and described earlier. First laser 202 emits first light beam 204 toward wing 14. In first system 200 in FIG. 13, first light beam 204 is initially directed at first reflective surface 208 positioned on wing 14 allowing first light beam 204 to be reflected from first reflective surface 208 and received by first light beam locating sensor 206 secured to fuselage 12. Further in first system 200, second laser 218 is secured to fuselage 12 of aircraft 10 aft of wing 14. Second laser 218 emits second light beam 220 toward wing 14. In first system 200, second light beam 220 is initially directed at second reflective surface 224 allowing second light beam 220 to be reflected from second reflective surface 224 positioned on wing 14 and received by second light beam locating sensor 222 secured to fuselage 12.

In second system 200' in FIG. 14, first laser 202 is secured to fuselage 12 of aircraft 10 forward of wing 14. This laser is also shown for example in further detail as laser 22 in FIG. 2 and described earlier. First laser 202 emits first light beam 204 toward wing 14 and in second system 200' in FIG. 14 first light beam 204 is initially directed, in this example, at first light beam locating sensor 206 positioned on wing 14. Second laser 218 is secured to fuselage 12 of aircraft 10 aft of wing 14. Second laser 218 emits second light beam 220 toward wing 14 and in second system 200' in FIG. 14 second light beam 220 is initially directed, in this example, at second light beam locating sensor 222 positioned on wing 14.

In both systems 200 and 200' first light beam locating sensor 206 is associated with a first position on wing 14 of aircraft 10 to be located and light beam locating sensor 206 senses a light beam 204 at an identifiable position on first light beam locating sensor 206. In these examples, first light beam locating sensor 206 is a photo-diode light beam locating sensor 54 such as seen in FIG. 6. Also, second light beam locating sensor 222 in this example will also be a photo-diode light beam locating sensor 54 also as seen in FIG. 6. In the operation of systems 200 and 200' first light beam 204 will be sensed by a diode 56 on panel 60 identifying an identifiable position on sensor 54 or first light beam locating sensor 206. Sensor 54 or first light beam locating sensor 206 is associated with a first position on wing 14 of aircraft 10 to be located by operation of systems 200 and 200', which will be discussed in more detail herein. Both systems 200 and 200' include processor 236 which is configured to receive a first signal 210 from first light beam locating sensor 206 wherein first signal 210 includes a first identifiable position on the first light beam locating sensor 206. Processor 236 determines a location of the first position on the wing, which will be discussed herein, and performs a first comparison of the location of the first position on wing 14 to a predetermined analyzed location of the first position on wing 14. As will be discussed in more detail herein, if a difference is identified in the first comparison, processor 236 will send out an instruction to control moving of a movable control surface which will be employed to correct the positioning of or otherwise untwist wing 14.

In referring to first system 200 as seen in FIG. 13, first system 200 includes first light beam locating sensor 206 associated with a first position on wing 14 to be located. First position to be located in this example is leading edge 18 of wing 14 at chord 226 of wing 14. This first position is a position system 200 is locating during flight and as will be described herein, system 200 is locating a second position to be located which includes trailing edge 20 of wing 14 at chord 226 of wing 14. In system 200 first light beam locating sensor 206 is secured to fuselage 12 with a known spatial and angular relationship between first light beam locating sensor 206 and the first position to be located on wing 14. This angular and spatial relationship between sensor 206 and the first position to be located on wing 14 also includes the positioning of first reflective surface 208 on wing 14 also associated in this example in a known spatial and angular relationship with first position to be located on wing 14. First light beam 204 reflects off of first reflective surface 208 and first light beam locating sensor 206 receives first light beam 204 reflected from first reflective surface 208. First light beam locating sensor 206 senses first light beam 204 at an identifiable position on first light beam locating sensor 206. More specifically, a particular diode 56 of sensor 206 receives first light beam 204 in this example. Processor 236 receives first signal 210 from first light beam locating sensor 206 which includes identifiable position of first light beam 204 on sensor 206. With processor 236 understanding the above described angular and spatial relationships processor 236 determines a location of the first position on wing 14 with receiving the identifiable position of first light beam 204 on sensor 206.

First signal 210 in this example is a wire communication from first light beam locating sensor 206 to first gimbal controller 212 with first signal 210 further transmitted as a wired communication 210 to processor 236. This communication in other examples can be a wireless transmission from first light beam locating sensor 206 to processor 236 and in other examples the transmission of first signal 210 can be a wire transmission direct from first light beam locating sensor 206 to processor 236.

Similarly in first system 200 as seen in FIG. 13, first system 200 includes second light beam locating sensor 222 associated with a second position on wing 14 to be located. Second position in this example, as mentioned above, is trailing edge 20 of wing 14 at chord 226 of wing 14. In system 200 second light beam locating sensor 222 is secured to fuselage 12 with also a known spatial and angular relationship between second light beam locating sensor 222 and the second position to be located on wing 14.

This angular and spatial relationship between second light beam locating sensor 222 and the second position to be located on wing 14 also includes the positioning of second reflective surface 224 on wing 14 also associated in this example in a known spatial and angular relationship with second position to be located on wing 14. Second light beam 220 reflects off of second reflective surface 224 and second light beam locating sensor 222 receives second light beam 220 reflected from second reflective surface 224. Second light beam locating sensor 222 senses second light beam 220 at an identifiable position on second light beam locating sensor 222. More specifically, a particular diode 56 of sensor 222 receives second light beam 220 in this example. Processor 236 receives second signal 228 from second light beam locating sensor 222 which includes identifiable position of second light beam 220 on sensor 222. With processor 236 understanding the above described angular and spatial relationships, processor 236 determines a location of the second position on wing 14 with receiving the identifiable position of second light beam 220 on sensor 222.

Similarly, second signal 228 in this example is a wire communication from second light beam locating sensor 222 to second gimbal controller 230 with second signal 228 further transmitted as a wired communication 228 to processor 236. This communication in other examples can be a wireless transmission from second light beam locating sensor 222 to processor 236 and in other examples the transmission of second signal 228 can be a wire transmission direct from second light beam locating sensor 222 to processor 236.

In system 200 with location of first and second positions having been determined by processor 236, processor 236 performs a first comparison of the location of the first position on wing 14 to a predetermined analyzed location of the first position on wing 14. Similarly, processor 236 performs a second comparison of the location of the second position on wing 14 to a predetermined analyzed location of the second position on wing 14.

In this example, the predetermined analyzed location for the first position and the predetermined analyzed location for the second position have been previously calculated and stored in this example in database 248. The calculated predetermined analyzed location for the first position provides an optimum location for leading edge 18 at chord 226 for aircraft 10 such that minimal drag is imparted by wing 14 on aircraft 10 with aircraft 10 traveling at a given airspeed, altitude and loading which aircraft 10 is currently experiencing in flight. This is similarly the case for the calculated predetermined analyzed location for second position which provides an optimum location for trailing edge 20 at chord 226 for aircraft 10 such that minimal drag is imparted by wing 14 on aircraft 10 with aircraft 10 traveling at a given airspeed, altitude and loading which aircraft 10 is currently experiencing in flight.

With processor 236 having completed the first and second comparisons, processor 236 sends an instruction to control moving of a movable control surface if there is a difference, in this example, in at least one of the first comparison or the second comparison. A difference identified in the first comparison and/or in the second comparison indicates wing 14 is not in an optimal position for aircraft 10 to be operating with a minimal drag configuration. A difference in the location of the first position of wing 14 at leading edge 18 at chord 226 with that of predetermined analyzed location for the first position and/or a difference in the location of the second position of wing 14 at trailing edge 20 at chord 226 with that of predetermined analyzed location for the second position indicates an unwanted twist in wing 14 which needs to be need to be reduced or otherwise corrected for aircraft 10 to optimally perform particularly with respect to fuel consumption.

In an example, processor 236 is configured to send an instruction 250 to control moving of a movable control surface if there is a difference in the first comparison. Similarly, processor 236 is configured to send an instruction 250 to control moving of a movable control surface if there is a difference in the second comparison.

Actuator controller 238 is configured to receive the instruction to control moving of a movable control surface and operate an actuator to move the movable control surface based on the instruction. Processor 236, as shown in FIG. 13, is coupled communicatively with actuator controller 238. Processor 236 and actuator controller 238 can be communicatively coupled in various ways such as being wired or by way of wireless communication. Processor 236 transmits instruction signal 250 to actuator controller 238 which is, in turn, communicatively coupled in this example to actuator 240, actuator 242 and actuator 253. Actuator 240 is connected, in this example, to moveable control surface such as leading edge wing control surface 244 positioned proximate to leading edge 18 at chord 226 of wing 14. Actuator 242 in this example is connected to moveable control surface such as trailing edge wing control surface 246 positioned proximate to trailing edge 20 at chord 226 of wing 14. Actuator 253 is connected to moveable control surface or spoiler control surface 252 positioned proximate to chord 226.

As determined by the first and second comparisons made by processor 236, a signal 250 will be provided to actuator controller 238 to in turn instruct by way of signals 254, 256 and/or 257 to have actuators 240, 242 and/or 253, respectively, adjust control surfaces 244, 246 and/or 252, respectively, as needed to redirect wing 14 into a desired configuration wherein the location of the first position, which includes leading edge 18 at chord 226, matches the predetermined analyzed location of the first position for leading edge 18 at chord 226 and the location of second position of trailing edge 20 at chord 226 matches a predetermined analyzed location for the second position for trailing edge 20 at chord 226. With matches attained as confirmed by the first and second comparisons made by processor 236, aircraft 10 while in operational flight will have optimum wing 14 positioning such that wing 14 twist will have been reduced or eliminated, reducing unnecessary drag on wing 14 and optimizing aircraft 10 fuel consumption.

With respect to second embodiment or second system 200' for correcting wing twist, as shown in FIG. 14, second system 200' includes first light beam locating sensor 206 associated with a first position on wing 14 of aircraft 10 to be located and light beam locating sensor 206. First light beam 204 sensed at an identifiable position on first light beam locating sensor 206 facilitates processor 236 locating the first position on wing 14. First light beam locating sensor 206 in this second embodiment is positioned on wing 14 associated with the first position on wing 14 of aircraft 10 to be located. First position to be located, as discussed earlier is leading edge 18 of wing 14 at chord 226 of wing 14. This first position is a position second system 200' is locating during flight and as will be described herein, second system 200' is also locating a second position to be located which includes trailing edge 20 of wing 14 at chord 226 of wing 14.

In second system 200' first light beam locating sensor 206 is secured to fuselage 12 with a known spatial and angular relationship between first light beam locating sensor 206 and the first position to be located on wing 14. First light beam 204 is received by first light beam locating sensor 206. First light beam locating sensor 206 receives and senses first light beam 204 at an identifiable position on first light beam locating sensor 206. More specifically, a particular diode 56, as seen in FIG. 6, a photo-diode light beam locating sensor as employed in this example as first light beam locating sensor 206. Processor 236 receives first signal 210 from first light beam locating sensor 206 which includes identifiable position of first light beam 204 on sensor 206. With processor 236 understanding the above described angular and spatial relationship of first light beam locating sensor 206 with respect to the first position to be located, processor 236 determines a location of the first position on wing 14 with receiving the identifiable position of first light beam 204 on sensor 206.

First signal 210 in this example is a wire communication from first light beam locating sensor 206 to first gimbal controller 212 with first signal 210 further transmitted as a wired communication 210 to processor 236. This communication in other examples can be a wireless transmission from first light beam locating sensor 206 to processor 236 and in other examples the transmission of first signal 210 can be a wire transmission direct from first light beam locating sensor 206 to processor 236.

Similarly in second system 200' as seen in FIG. 14, second system 200' includes second light beam locating sensor 222 associated with a second position on wing 14 to be located. Second position in this example, as mentioned above, is trailing edge 20 of wing 14 at chord 226 of wing 14. In second system 200' second light beam locating sensor 222 is secured to wing 14 with also a known spatial and angular relationship between second light beam locating sensor 222 and the second position to be located on wing 14.

Second light beam locating sensor 222 receives and senses second light beam 220 at an identifiable position on second light beam locating sensor 222. More specifically, a particular diode 56 of second light beam locating sensor 222 receives and senses second light beam 220 in this example. Processor 236 receives second signal 228 from second light beam locating sensor 222 which includes identifiable position of second light beam 220 on second light beam locating sensor 222. With processor 236 understanding the above described angular and spatial relationship between second light beam locating sensor 222 and second position to be located, processor 236 determines a location of the second position on wing 14 with receiving the identifiable position of second light beam 220 on second light beam locating sensor 222.

Similarly, second signal 228 in this example is a wire communication from second light beam locating sensor 222 to second gimbal controller 230 with second signal 228 further transmitted as a wired communication 228 to processor 236. This communication in other examples can be a wireless transmission from second light beam locating sensor 222 to processor 236 and in other examples the transmission of second signal 228 can be a wire transmission direct from second light beam locating sensor 222 to processor 236.

In second system 200', with location of first and second positions having been determined by processor 236, processor 236 performs a first comparison of the location of the first position on wing 14 to a predetermined analyzed location of the first position on wing 14. Similarly, processor 236 performs a second comparison of the location of the second position on wing 14 to a predetermined analyzed location of the second position on wing 14.

In this example, the predetermined analyzed location for the first position and the predetermined analyzed location for the second position have been previously calculated and stored in this example in database 248. As previously discussed, the calculated predetermined analyzed location for the first position provides an optimum location for leading edge 18 at chord 226 for aircraft 10 such that minimal drag is imparted by wing 14 on aircraft 10 with aircraft 10 traveling at a given airspeed, altitude and loading which aircraft 10 is currently experiencing in flight. This is similarly the case for the calculated predetermined analyzed location for second position which provides an optimum location for trailing edge 20 at chord 226 for aircraft 10 such that minimal drag is imparted by wing 14 on aircraft 10 with aircraft 10 traveling at a given airspeed, altitude and loading which aircraft 10 is currently experiencing in flight.

With processor 236 having completed the first and second comparisons, processor 236 sends an instruction to control moving of a movable control surface if there is a difference, in this example, in at least one of the first comparison or the second comparison. A difference identified in the first comparison and/or in the second comparison indicates wing 14 is not in an optimal position for aircraft 10 to be operating with a minimal drag configuration. A difference in the location of the first position of wing 14 at leading edge 18 at chord 226 with that of predetermined analyzed location for the first position and/or a difference in the location of the second position of wing 14 at trailing edge 20 at chord 226 with that of predetermined analyzed location for the second position indicates an unwanted twist in wing 14 which needs to be need to be reduced or otherwise corrected for aircraft 10 to optimally perform particularly with respect to fuel consumption.

In an example, processor 236 is configured to send an instruction 250 to control moving of a movable control surface if there is a difference in the first comparison. Similarly, processor 236 is configured to send an instruction 250 to control moving of a movable control surface if there is a difference in the second comparison.

Actuator controller 238 is configured to receive the instruction to control moving of a movable control surface and operate an actuator to move the movable control surface based on the instruction. Processor 236, as shown in FIG. 14, is coupled communicatively with actuator controller 238. Processor 236 and actuator controller 238 can be communicatively coupled in various ways such as being wired or by way of wireless communication. Processor 236 transmits instruction signal 250 to actuator controller 238 which is, in turn, communicatively coupled in this example to actuator 240, actuator 242 and actuator 253. Actuator 240 is connected, in this example, to moveable control surface such as leading edge wing control surface 244 positioned proximate to leading edge 18 at chord 226 of wing 14. Actuator 242 in this example is connected to moveable control surface such as trailing edge wing control surface 246 positioned proximate to trailing edge 20 at chord 226 of wing 14. Actuator 253 is connected to moveable control surface or spoiler control surface 252 positioned proximate to chord 226.

As determined by the first and second comparisons made by processor 236, a signal 250 will be provided to actuator controller 238 to in turn instruct by way of signals 254, 256 and/or 257 to have actuators 240, 242 and/or 253, respectively, adjust control surfaces 244, 246 and/or 252, respectively, as needed to redirect wing 14 into a desired configuration wherein the location of the first position, which includes leading edge 18 at chord 226, matches the predetermined analyzed location of the first position for leading edge 18 at chord 226 and the location of second position of trailing edge 20 at chord 226 matches a predetermined analyzed location for the second position for trailing edge 20 at chord 226. With matches attained as confirmed by the first and second comparisons made by processor 236, aircraft 10 while in operational flight will have optimum wing 14 positioning such that wing twist will have been reduced or eliminated, reducing unnecessary drag on wing 14 and optimizing aircraft 10 fuel consumption.

In operation of first system 200 and second system 200' for correcting wing 14 twist of aircraft 10, it is advantageous for first light beam 204 to stay aligned with first light beam locating sensor 206 and for second light beam 220 to stay aligned with second light beam locating sensor 222. Alignment provides first light beam locating sensor 206 and second light beam locating sensor 222 sensing first light beam 204 and second light beam 220, respectively. Without first and/or second light beam being sensed, first system 200 and second system 200' are placed in a non-operative state.

To maintain first light beam 204 aligned with first light beam locating sensor 206 and to maintain second light beam 220 aligned with second light beam locating sensor 222, first laser 202 is mounted to first gimbal 214 having first gimbal controller 212 and second laser 218 is mounted to second gimbal 232 having second gimbal controller 230. First gimbal controller 212 is communicatively coupled to first light beam locating sensor 206 and second gimbal controller 230 is communicatively coupled to second light beam locating sensor 222. First light beam locating sensor 206 sends signal 210 to first gimbal controller 212 including the identifiable position of the first light beam 204 on the first light beam locating sensor 206 and second light beam locating sensor 222 sends signal 228 to second gimbal controller 230 including the identifiable position of the second light beam 220 on second light beam locating sensor 222.

In this example, first light beam locating sensor 206 and second light beam locating sensor 222 are each a photo-diode light beam locating sensor 54 as shown in FIG. 6 and will be referred to as photo-diode light beam locating sensor 54 in the description below. With first gimbal controller 212 having received signal 210, first gimbal controller 212 determines whether the identifiable position of first light beam 204 is positioned within an acceptable distance from edge 57 of photo-diode light beam locating sensor 54, being in this example first light beam locating sensor 206, or is positioned outside of the acceptable distance from edge 57. This is similarly the set up with second gimbal controller 230 having received signal 228. Second gimbal controller 230 determines whether the identifiable position of second light beam 220 is positioned within an acceptable distance from edge 57 of photo-diode light beam locating sensor 54, being second sensor 222 or is positioned outside of the acceptable distance from edge 57 of photo-diode light beam locating sensor 54, being second light beam locating sensor 222.

First system 200 and second system 200' can be set up to select what is an acceptable distance for first or second light beam 204, 220 to be sensed from edge 57 from photo-diode light beam sensor 54 for each system. In this example, as seen in FIG. 6, diode 56 which is designated as C is centrally positioned on panel 60 of photo-diode light beam locating sensor 54. An acceptable distance for first and second light beams 204 and 220 to be sensed from edge 57, in this example, is a distance which is closer to diode 56 designated as C than a distance to edge 57. Light beam being positioned outside the acceptable distance from edge 57 would be the light beam being sensed closer to edge 57 than to central diode 56 designated as C.

If the identifiable position received by first gimbal controller 212 is positioned outside the acceptable distance from edge 57 of sensor 54 or first light beam locating sensor 206, first gimbal controller 212 sends an instruction to first gimbal 214 to move first laser 202 so as to move first light beam 204 of first laser 202 to a distance from edge 57 of sensor 54, or first light beam locating sensor 206, to within the acceptable distance from edge 57 of the first light beam locating sensor 206 or sensor 54. This would be, in this example, moving first light beam 204 to a position to be sensed on sensor 54 closer to diode 56 designated as C than the distance to edge 57. Similarly, if the identifiable position received by second gimbal controller 230 is positioned outside the acceptable distance from edge 57 of sensor 54, second gimbal controller 230 sends an instruction to second gimbal 232 to move second laser 218 so as to move second light beam 220 of second laser 218 to a distance from edge 57 of sensor 54, or second light beam locating sensor 222, to within the acceptable distance from edge 57 of the second light beam locating sensor 222 or 54. This would be moving second light beam 220 to a position to be sensed on sensor 54 closer to diode 56 designated as C than the distance to edge 57.

Method 300, as set forth in FIG. 15, is provided for correcting wing twist of aircraft 10. Method 300 includes step 302 sensing a first light beam 204 at an identifiable position on a first light beam locating sensor 206, wherein first light beam locating sensor 206 is associated with a first position on wing 14 of aircraft 10 to be located. Method 300 further includes step 304 receiving by processor 236 a first signal 210 from first light beam locating sensor 206 wherein first signal 210 includes the identifiable position on first light beam locating sensor 206. Step 306 includes determining by processor 236 a location of the first position on wing 14. Also included in method 300 is step 308 performing by processor 236 a first comparison of the location of the first position on wing 14 to a predetermined analyzed location of the first position on wing 14. Method 300 further includes sending by processor 236 an instruction 250 to control moving of a movable control surface if there is a difference in the first comparison. With a difference in the first comparison wing 14 is in need of reconfiguring to reduce drag has been discussed earlier. Method 300 further includes receiving by actuator controller 238 configured to receive the instruction 250 and actuator controller 238 operating actuator, such as one or more of 240, 242 or 253 to move movable control surface 244, 246 or 254 which corresponds to one or more of the actuators being operated based on instruction 250.

Method 300 further includes sensing second light beam 220 at a second identifiable position on second light beam locating sensor 222 by second light beam locating sensor 222 associated with a second position on wing 14 of aircraft 10 to be located. Also included is receiving by processor 236 second signal 228 from second light beam locating sensor 222 wherein the second signal 228 includes the second identifiable position on the second light beam locating sensor 222. Method 300 further includes determining by processor 236 a location of the second position on wing 14. Once the location of the second position on wing 14 has been determined method 300 includes performing by processor 236 a second comparison of the location of the second position on wing 14 to a predetermined analyzed location of the second position on wing 14. With the completion of the second comparison, method 300 further includes sending by processor 236 an instruction 250 to control moving of a movable control surface such as one or more 244, 246 or 254 if there is a difference in the second comparison. In carrying out the reconfiguration of wing 14 or untwisting wing 14 receiving by an actuator controller 238 configured to receive the instruction 250 and actuator controller 238 operating an actuator such as one or more of 240, 242 or 253 to move movable control surface 244, 246 or 254 which corresponds to one or more of the actuators being operated based on instruction 250.

The step of determining by processor 236 a location of the first position on wing 14 further includes the location including leading edge 18 of wing 14 at chord 226 of wing 14. The step of determining by processor 236 a location of the second position on wing 14 further includes the location including trailing edge 20 of wing 14 at chord 226 of wing 14.

In carrying out one embodiment of method 300 with utilizing system 200, as discussed earlier, method 300 includes the step of reflecting first light beam 204 from a first reflective surface 208 positioned on wing 14 associated with the first position to be located on wing 14. This embodiment further includes reflecting the second light beam 220 from a second reflective surface 224 positioned on wing 14 associated with the second position to be located on wing 14. The embodiment further includes receiving by first light beam locating sensor 206 secured to fuselage 12 of aircraft 10 the first light beam 204 reflected by the first reflective surface 208 and includes receiving by the second light beam locating sensor 222 secured to fuselage 12 of aircraft 10 the second light beam 220 reflected by second reflective surface 224.

In carrying out a second embodiment of method 300 with utilizing second system 200', as discussed earlier, method 300 includes the step of sensing first light beam 204 at an identifiable position on first light beam locating sensor 206 wherein first light beam locating sensor 206 is associated with the first position on wing 14 of aircraft 10 to be located includes first light beam locating sensor positioned on wing 14 of aircraft 10. This second embodiment of method 300 includes sensing second light beam 220 at an identifiable position on second light beam locating sensor 222 wherein second light beam locating sensor 222 is associated with the second position on wing 14 of aircraft 10 to be located includes second light beam locating sensor 222 positioned on wing 14 of aircraft 10.

Method 300 further includes emitting first light beam from laser 202 secured to fuselage 12 of aircraft 10 wherein first laser 202 is mounted to first gimbal 214 having a first gimbal controller 212. First laser 202 is located forward of wing 14 and positioned to emit first light beam 204 toward wing 14. Method 300 further includes emitting second light beam 220 from second laser 218 secured to fuselage 12 of aircraft 10 wherein second laser 218 is mounted to second gimbal 232 having second gimbal controller 230. Second laser 218 is located aft of wing 14 and positioned to emit second light beam 220 toward wing 14.

Method 300 further includes maintaining first light beam 204 aligned with first light beam locating sensor 206 and second light beam 220 aligned with second light beam locating sensor 222 so as to maintain first system 200 and second system 200' operating as earlier discussed. As a result, method 300 includes sending first signal 210 from first light beam locating sensor 206 including the identifiable position of first light beam 204 on first light beam locating sensor 206, to first gimbal controller 212 and further includes sending second signal 228 from second light beam locating sensor 222 including the identifiable position of second light beam 220 on second light beam locating sensor 222 to second gimbal controller 230.

Method 300 includes receiving first signal 210 by first gimbal controller 212 and first gimbal controller 212 determining whether the identifiable position of first light beam 202 on first light beam locating sensor 206 is positioned within an acceptable distance from edge 57 of first light beam locating sensor 206 or is positioned outside of the acceptable distance from edge 57 of first light beam locating sensor 206. If the identifiable position is positioned outside of the acceptable distance from edge 57 of first light beam locating sensor 206, first gimbal controller 212 sends an instruction to first gimbal 214 to move first laser 202 and to move first light beam 204 of first laser 202 to a distance from edge 57 of first light beam locating sensor 206 within the acceptable distance from edge 57 of first light beam locating sensor 206. Method 300 further includes receiving second signal 228 by second gimbal controller 230 and second gimbal controller 230 determining whether the identifiable position of second light beam 220 on second light beam locating sensor 222 is positioned within an acceptable distance from an edge 57 of second light beam locating sensor 222 or is positioned outside of the acceptable distance from edge 57 of second light beam locating sensor 222. If the identifiable position is positioned outside of the acceptable distance from edge 57 of second light beam locating sensor 222, second gimbal controller 230 sends an instruction to second gimbal 232 to move second laser 218 and to move second light beam 220 of second laser 218 to a distance from edge 57 of second light beam locating sensor 222 within the acceptable distance from edge 57 of second light beam locating sensor 222.

While various embodiments have been described above, this disclosure is not intended to be limited thereto. Variations can be made to the disclosed embodiments that are still within the scope of the appended claims.

What is claimed:

1. A system comprising:
  a first light beam locating sensor associated with a first position to be located on a wing of an aircraft; wherein the first light beam locating sensor senses a first light beam at a first identifiable position on the first light beam locating sensor; and
  a processor configured to:
    receive a first signal from the first light beam locating sensor, the first signal including the first identifiable position on the first light beam locating sensor;
    determine a location of the first position on the wing;
    perform a first comparison of the location of the first position on the wing to a predetermined analyzed location of the first position on the wing; and
    to send an instruction to control moving of a movable control surface if there is a difference in the first comparison.

2. The system of claim 1 wherein:
  an actuator controller configured to receive the instruction and to operate an actuator to move the movable control surface based on the instruction.

3. The system of claim 1 further includes a second light beam locating sensor associated with a second position on the wing of the aircraft, wherein the second light beam locating sensor senses a second light beam at a second identifiable position on the second light beam locating sensor.

4. The system of claim 3 wherein the processor is further configured to:
  receive a second signal from the second light beam locating sensor, the second signal including the second identifiable position on the second light beam locating sensor;
  determine a location of the second position on the wing; and
  perform a second comparison of the location of the second position on the wing to a predetermined analyzed location of the second position on the wing.

5. The system of claim 4 wherein:
  the processor is further configured to send an instruction to control moving of the movable control surface if there is a difference in the second comparison; and an actuator controller configured to receive the instruction and to operate an actuator to move the movable control surface based on the instruction.

6. The system of claim 3 wherein:
the first light beam locating sensor is associated with the first position to be located on the wing wherein the first position to be located on the wing comprises a leading edge of the wing at a chord of the wing; and
the second light beam locating sensor is associated with the second position to be located on the wing wherein the second position to be located on the wing comprises a trailing edge of the wing at the chord of the wing.

7. The system of claim 3 further includes:
a first reflective surface positioned on the wing associated with the first position to be located on the wing; and
a second reflective surface positioned on the wing associated with the second position to be located on the wing.

8. The system of claim 7 wherein:
the first light beam locating sensor is secured to a fuselage of the aircraft and receives first light beam reflected from the first reflective surface; and
the second light beam locating sensor is secured to the fuselage of the aircraft and receives the second light beam reflected from the second reflective surface.

9. The system of claim 3 wherein:
the first light beam locating sensor is positioned on the wing associated with the first position on the wing of the aircraft; and
the second light beam locating sensor is positioned on the wing associated with the second position on the wing of the aircraft.

10. The system of claim 3 further includes:
a first laser secured to a fuselage of the aircraft, located forward of the wing and positioned to emit the first light beam toward the wing and a second laser secured to the fuselage of the aircraft, or located aft of the wing and positioned to emit a second light beam toward the wing; and
wherein:
the first laser is mounted to a first gimbal having a first gimbal controller; and
the second laser is mounted to a second gimbal having a second gimbal controller.

11. The system of claim 10 wherein:
the first gimbal controller is communicatively coupled to the first light beam locating sensor and the second gimbal controller is communicatively coupled to the second light beam locating sensor;
the first light beam locating sensor sends a first signal to the first gimbal controller including the first identifiable position of the first light beam on the first light beam locating sensor; and
the second light beam locating sensor sends a second signal to the second gimbal controller including the second identifiable position of the second light beam on the second light beam locating sensor.

12. The system of claim 11 wherein:
the first gimbal controller determines whether the first identifiable position of the first light beam on the first light beam locating sensor is positioned within an acceptable distance from an edge of the first light beam locating sensor or is positioned outside of the acceptable distance from the edge of the first light beam locating sensor, and if the first identifiable position is positioned outside of the acceptable distance from the edge of the first light beam locating sensor, the first gimbal controller sends an instruction to the first gimbal to move the first laser so as to move the first light beam of the first laser to a distance from the edge of the first light beam locating sensor to within the acceptable distance from the edge of the first light beam locating sensor; and
the second gimbal controller determines whether the second identifiable position of the second light beam on the second light beam locating sensor is positioned within an acceptable distance from an edge of the second light beam locating sensor or is positioned outside of the acceptable distance from the edge of the second light beam locating sensor, and if the second identifiable position is positioned outside of the acceptable distance from the edge of the second light beam locating sensor, the second gimbal controller sends an instruction to the second gimbal to move the second laser so as to move the second light beam of the second laser to a distance from the edge of the second light beam locating sensor to within the acceptable distance from the edge of the second light beam locating sensor.

13. A method comprising the steps of:
sensing a first light beam at a first identifiable position on a first light beam locating sensor, wherein the first light beam locating sensor is associated with a first position to be located on a wing of an aircraft;
receiving by a processor a first signal from the first light beam locating sensor, the first signal including the first identifiable position on the first light beam locating sensor;
determining by the processor a location of the first position on the wing;
performing by the processor a first comparison of the location of the first position on the wing to a predetermined analyzed location of the first position on the wing; and
sending by the processor a first instruction to control moving of a movable control surface if there is a difference in the first comparison.

14. The method of claim 13 further comprising the step of:
receiving by an actuator controller configured to receive the first instruction and the actuator controller operating an actuator to move the movable control surface based on the first instruction.

15. The method of claim 13 further comprising the steps of:
sensing a second light beam at a second identifiable position on the second light beam locating sensor by a second light beam locating sensor associated with a second position on the wing of the aircraft;
receiving by the processor a second signal from the second light beam locating sensor, the second signal including the second identifiable position on the second light beam locating sensor;
determining by the processor a location of the second position on the wing;
performing by the processor a second comparison of the location of the second position on the wing to a predetermined analyzed location of the second position on the wing;
sending by the processor a second instruction to control moving of the movable control surface if there is a difference in the second comparison; and
receiving by an actuator controller configured to receive the second instruction and the actuator controller operating an actuator to move the movable control surface based on the second instruction.

16. The method of claim 15 wherein:
the step of determining by the processor the location of the first position on the wing further includes the location comprising a leading edge of the wing at a chord of the wing; and
the step of determining by the processor the location of the second position on the wing further includes the location comprising a trailing edge of the wing at the chord of the wing.

17. The method of claim 15 further comprising the steps of:
reflecting the first light beam from a first reflective surface positioned on the wing associated with the first position to be located on the wing;
reflecting the second light beam from a second reflective surface positioned on the wing associated with the second position to be located on the wing;
receiving by the first light beam locating sensor secured to a fuselage of the aircraft the first light beam reflected by the first reflective surface; and
receiving by the second light beam locating sensor secured to the fuselage of the aircraft the second light beam reflected by the second reflective surface.

18. The method of claim 15 wherein the steps of:
sensing the first light beam at the first identifiable position on a first light beam locating sensor;
wherein the first light beam locating sensor is associated with the first position on the wing of the aircraft includes the first light beam locating sensor positioned on the wing of the aircraft; and
sensing the second light beam at the second identifiable position on a second light beam locating sensor wherein the second light beam locating sensor is associated with the second position on the wing of the aircraft includes the second light beam locating sensor positioned on the wing of the aircraft.

19. The method of claim 15 further including the steps of:
emitting the first light beam from a first laser secured to a fuselage of the aircraft wherein:
the first laser is mounted to a first gimbal having a first gimbal controller; and
the first laser is located forward of the wing and positioned to emit the first light beam toward the wing;
emitting the second light beam from a second laser secured to the fuselage of the aircraft wherein:
the second laser is mounted to a second gimbal having a second gimbal controller; and
the second laser is located aft of the wing and positioned to emit the second light beam toward the wing.

20. The method of claim 19, further including the steps of:
sending a first signal from the first light beam locating sensor, including the first identifiable position of the first light beam on the first light beam locating sensor, to the first gimbal controller;
sending a second signal from the second light beam locating sensor, including the second identifiable position of the second light beam on the second light beam locating sensor, to the second gimbal controller;
receiving the first signal by the first gimbal controller and the first gimbal controller determining whether the first identifiable position of the first light beam on the first light beam locating sensor is positioned within an acceptable distance from an edge of the first light beam locating sensor or is positioned outside of the acceptable distance from the edge of the first light beam locating sensor, and if the first identifiable position is positioned outside of the acceptable distance from the edge of the first light beam locating sensor, first gimbal controller sending an instruction to the first gimbal to move the first laser and to move the first light beam of the first laser to a distance from the edge of the first light beam locating sensor within the acceptable distance from the edge of the first light beam locating sensor; and
receiving the second signal by the second gimbal controller and the second gimbal controller determining whether the second identifiable position of the second light beam on the second light beam locating sensor is positioned within an acceptable distance from an edge of the second light beam locating sensor or is positioned outside of the acceptable distance from the edge of the second light beam locating sensor, and if the second identifiable position is positioned outside of the acceptable distance from the edge of the second light beam locating sensor, second gimbal controller sending an instruction to the second gimbal to move the second laser and to move the second light beam of the second laser to a distance from the edge of the second light beam locating sensor within the acceptable distance from the edge of the second light beam locating sensor.

* * * * *